(12) United States Patent
Nagai

(10) Patent No.: US 10,703,271 B2
(45) Date of Patent: Jul. 7, 2020

(54) VEHICLE DISPLAY DEVICE, VEHICLE DISPLAY METHOD, AND RECORDING MEDIUM FOR DISPLAYING IMAGES

(71) Applicant: JVC KENWOOD Corporation, Yokohama-shi, Kanagawa (JP)

(72) Inventor: Katsuyuki Nagai, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 10 days.

(21) Appl. No.: 16/034,389

(22) Filed: Jul. 13, 2018

(65) Prior Publication Data

US 2018/0319337 A1 Nov. 8, 2018

Related U.S. Application Data

(63) Continuation of application No. PCT/JP2017/001313, filed on Jan. 17, 2017.

(30) Foreign Application Priority Data

May 10, 2016 (JP) .................................. 2016-094626
Jun. 28, 2016 (JP) .................................. 2016-127890

(51) Int. Cl.
*B60R 1/00* (2006.01)
*B60R 21/00* (2006.01)
(Continued)

(52) U.S. Cl.
CPC ................ *B60R 1/00* (2013.01); *B60R 21/00* (2013.01); *G01B 17/06* (2013.01); *G01S 7/4808* (2013.01); *G01S 7/539* (2013.01); *G01S 15/10* (2013.01); *G01S 15/86* (2020.01);
*G01S 15/87* (2013.01); *G01S 15/931* (2013.01); *G01S 17/42* (2013.01); *G01S 17/86* (2020.01); *G01S 17/87* (2013.01); *G01S 17/931* (2020.01);
(Continued)

(58) Field of Classification Search
None
See application file for complete search history.

(56) References Cited

U.S. PATENT DOCUMENTS 5,521,594 A * 5/1996 Fukushima ........ B60G 17/0165
340/901
9,497,422 B2 * 11/2016 Mitsuta ..................... B60R 1/00
(Continued)

FOREIGN PATENT DOCUMENTS

CN 1865849 A 11/2006
CN 105073545 A 11/2015
(Continued)

*Primary Examiner* — Kate H Luo
(74) *Attorney, Agent, or Firm* — Brundidge & Stanger, P.C.

(57) ABSTRACT

An image acquisition unit acquires an image around a vehicle. A generator generates a bird's-eye image based on the acquired image. A road surface information acquisition unit acquires information on a road surface around the vehicle. A road surface determination unit determines whether a road surface that requires attention is found by referring to the acquired information on the road surface. When it is determined that a road surface that requires attention is found, an image processor superimposes an image showing the road surface that requires attention on the bird's-eye image.

7 Claims, 31 Drawing Sheets

(51) Int. Cl.
| | |
|---|---|
| H04N 7/18 | (2006.01) |
| G01S 15/931 | (2020.01) |
| G01S 17/42 | (2006.01) |
| G01S 7/48 | (2006.01) |
| G01S 7/539 | (2006.01) |
| G01S 15/87 | (2006.01) |
| G01S 17/87 | (2020.01) |
| H04N 5/232 | (2006.01) |
| H04N 5/247 | (2006.01) |
| G01S 15/86 | (2020.01) |
| G01S 17/86 | (2020.01) |
| G01S 17/931 | (2020.01) |
| G01B 17/06 | (2006.01) |
| G01S 15/10 | (2006.01) |
| G06K 9/00 | (2006.01) |
| H04N 5/262 | (2006.01) |
| G01S 17/36 | (2006.01) |
| G01B 17/00 | (2006.01) |
| G01B 11/24 | (2006.01) |
| G01B 11/02 | (2006.01) |
| H04N 5/272 | (2006.01) |

(52) U.S. Cl.
CPC ..... *G06K 9/00798* (2013.01); *H04N 5/23238* (2013.01); *H04N 5/247* (2013.01); *H04N 5/2628* (2013.01); *H04N 7/18* (2013.01); *H04N 7/181* (2013.01); *B60R 2300/20* (2013.01); *B60R 2300/30* (2013.01); *B60R 2300/303* (2013.01); *B60R 2300/307* (2013.01); *B60R 2300/605* (2013.01); *B60R 2300/607* (2013.01); *G01B 11/026* (2013.01); *G01B 11/24* (2013.01); *G01B 17/00* (2013.01); *G01S 17/36* (2013.01); *H04N 5/272* (2013.01)

(56) References Cited

U.S. PATENT DOCUMENTS

| | | | |
|---|---|---|---|
| 2006/0269105 A1* | 11/2006 | Langlinais | G03B 7/08 382/105 |
| 2007/0003108 A1 | 1/2007 | Chinomi et al. | |
| 2010/0191434 A1* | 7/2010 | Fujita | B60T 8/172 701/91 |
| 2013/0147958 A1* | 6/2013 | Mitsuta | B60R 1/00 348/148 |
| 2014/0139640 A1* | 5/2014 | Shimizu | G06K 9/00791 348/46 |
| 2014/0152774 A1* | 6/2014 | Wakabayashi | G08G 1/168 348/46 |
| 2014/0207411 A1* | 7/2014 | Laurent | G01B 11/30 702/159 |
| 2015/0353095 A1 | 12/2015 | Freess | |
| 2016/0060824 A1* | 3/2016 | Akashi | E01C 23/01 348/148 |
| 2016/0114727 A1* | 4/2016 | Watanabe | H04N 7/181 348/118 |
| 2017/0161572 A1* | 6/2017 | Zhao | G06T 7/30 |

FOREIGN PATENT DOCUMENTS

| | | |
|---|---|---|
| JP | 2005001570 A | 1/2005 |
| JP | 2009-049943 A | 3/2009 |
| JP | 2009049943 A | 3/2009 |
| WO | 2013018173 A1 | 2/2013 |

* cited by examiner

FIG.10

| ROAD SURFACE SHAPE | | PARAMETER | SAFE | DRIVER CAREFULLY | DON'T DRIVE |
|---|---|---|---|---|---|
| DITCH | | DITCH WIDTH (t) | 0<t≦5cm | 5cm<t≦10cm | 10cm<t |
| DOWNWARD STEP | LONGITUDINAL | HEIGHT (h) | 0<h≦4cm | 4cm<h≦8cm | 8cm<h |
| | TRANSVERSAL | HEIGHT (h) | 0<h≦3cm | 3cm<h≦5cm | 5cm<h |
| UPWARD STEP | LONGITUDINAL | HEIGHT (h) | 0<h≦4cm | 4cm<h≦8cm | 8cm<h |
| | TRANSVERSAL | HEIGHT (h) | 0<h≦3cm | 3cm<h≦5cm | 5cm<h |

| ROAD SURFACE SHAPE | PARAMETER | SAFE | OPEN THE DOOR CAREFULLY | DON'T OPEN THE DOOR |
|---|---|---|---|---|
| UPWARD STEP (TRANSVERSAL) | HEIGHT (h) | 0<h≦3cm | 3cm<h≦5cm | 5cm<h |

48

VEHICLE DISPLAY DEVICE, VEHICLE DISPLAY METHOD, AND RECORDING MEDIUM FOR DISPLAYING IMAGES

CROSS-REFERENCE TO RELATED APPLICATION

This application is based upon and claims the benefit of priority from the prior Japanese Patent Application No. 2016-094626, filed on May 10, 2016, and Japanese Patent Application No. 2016-127890, filed on Jun. 28, 2016, the entire contents of which are incorporated herein by reference.

BACKGROUND

1. Field

The present invention relates to a display technology for vehicles and, in particular, to a vehicle display device, a vehicle display method and recording medium for displaying images.

2. Description of the Related Art

A plurality of cameras for capturing images outside a vehicle is mounted on the vehicle. The images captured by the cameras are synthesized. A bird's-eye image of an area around the vehicle viewed as if from the camera provided above the vehicle is formed and displayed on a monitor. The shape of a 3D object that represents an obstacle cannot be accurately displayed in the bird's-eye image generated by viewpoint transform. It is therefore difficult to intuitively distinguish whether an object captured in the image is a 3D object or a planar object. Therefore, a 3D object having a predetermined height or greater is displayed in a mode different from that of the other objects (see, for example, patent document 1).

[patent document 1] JP2009-49943

The images captured by the imaging units provided in various locations in the vehicle are subjected to viewpoint transform to generate a bird's-eye image as viewed from above the vehicle. Where an obstacle is not found around the vehicle but a step is found on the road surface around the vehicle, it is difficult to know whether or not there is a step by viewing the bird's-eye image.

SUMMARY

A vehicle display device according to one embodiment comprises: an image acquisition unit that acquires an image around a vehicle; a generator that subjects the image acquired by the image acquisition unit to viewpoint transform to generate a bird's-eye image as viewed from above the vehicle; a road surface information acquisition unit that acquires information on a road surface shape or a road surface condition around the vehicle; a road surface determination unit that determines whether a road surface shape or a road surface condition that requires attention is found by referring to the information on the road surface shape or the road surface condition acquired by the road surface information acquisition unit; an image processor that, when the road surface determination unit determines that a road surface shape or a road surface condition that requires attention is found, superimposes an image showing the road surface shape or the road surface condition that requires attention on the bird's-eye image; and a display controller that causes a display unit to display the bird's-eye image on which the image is superimposed by the image processor.

Another embodiment relates to a vehicle display method. The method comprises: acquiring an image around a vehicle; subjecting the image acquired to viewpoint transform to generate a bird's-eye image as viewed from above the vehicle; acquiring information on a road surface shape or a road surface condition around the vehicle; determining whether a road surface shape or a road surface condition that requires attention is found by referring to the information on the road surface shape or the road surface condition acquired; when it is determined that a road surface shape or a road surface condition that requires attention is found, superimposing an image showing the road surface shape or the road surface condition that requires attention on the bird's-eye image; and causing a display unit to display the bird's-eye image on which the image is superimposed.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 10 shows a data structure of a table stored in the road surface shape determination unit of FIG. 3;

FIG. 20 shows a data structure of the table stored in the road surface shape determination unit of FIG. 18;

DETAILED DESCRIPTION

The invention will now be described by reference to the preferred embodiments. This does not intend to limit the scope of the present invention, but to exemplify the invention.

Embodiment 1

Embodiment 1 of the present invention relates to a vehicle display device that generates a bird's-eye image by subjecting images captured by a plurality of imaging units provided in a vehicle to viewpoint transform and displays the bird's-eye image thus generated. In viewpoint transform, a captured image is mapped to a plane on the ground. Therefore, objects included in the captured image are shown as if they are arranged on the plane on the ground. Therefore, a step found on the road surface around the vehicle is displayed to look planar in the bird's-eye image. This makes it difficult for a driver to know whether there is a step by viewing the bird's-eye image. In particular, the perpendicular surface of a step that descends in a direction away from the vehicle is not captured by the imaging unit so that it is even more difficult to know such a step.

To address this, the vehicle display device according to the embodiment performs the following steps. The vehicle is provided with a plurality of sensors. The vehicle display device acquires the road surface shape around the vehicle by referring to the result of detection by the plurality of sensors. If a road surface condition that requires attention is found in the acquired road surface shape, the vehicle display device displays a bird's-eye image in which an image showing the road surface shape is superimposed. The road surface shape that requires attention is, for example, a step found on the road surface.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the specification and drawings that have substantially identical functions and structures are represented by the same reference symbols so that the description is not duplicated. Elements not relevant to the embodiments directly are omitted from the illustration.

Figure 1:
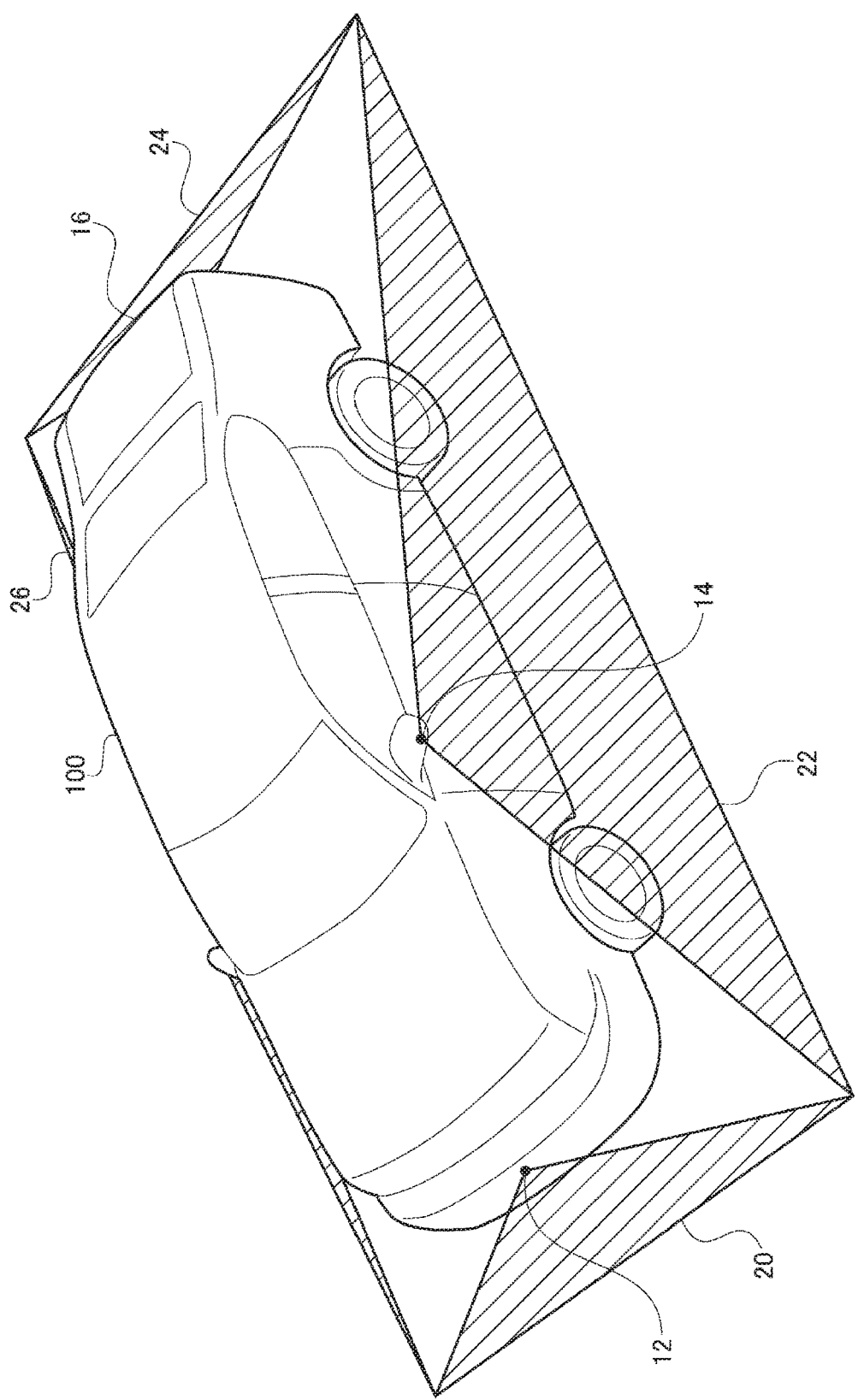
FIG. 1 is a perspective view showing an imaging range formed around a vehicle according to Embodiment 1.

FIG. 1 is a perspective view showing an imaging range formed around a vehicle 100 according to Embodiment 1. A front imaging unit 12 is provided in the frontal portion (e.g., a bumper, bonnet, etc.) of the vehicle 100. The front imaging unit 12 forms a front imaging area 20 extending forward from the front imaging unit 12 and captures an image in the front imaging area 20. A left imaging unit 14 is provided in the left portion (e.g., below a left door mirror, etc.) of the vehicle 100. The left imaging unit 14 forms a left imaging area 22 extending leftward from the left imaging unit 14 and captures an image in the left imaging area 22.

A rear imaging unit 16 is provided in the rear portion (e.g., a bumper, trunk, etc.) of the vehicle 100. The rear imaging unit 16 forms a rear imaging area 24 extending rearward from the rear imaging unit 16 and captures an image in the rear imaging area 24. A right imaging unit 18 (not shown) is provided in the right portion of the vehicle 100 so as to be symmetrical with the left imaging unit 14. The right imaging unit 18 forms a right imaging area 26 extending rightward from the right imaging unit 18 and captures an image in the right imaging area 26. The front imaging unit 12, the left imaging unit 14, the rear imaging unit 16, and the right imaging unit 18 form an imaging unit 10. The imaging unit 10 captures images around the vehicle 100.

Figure 2:
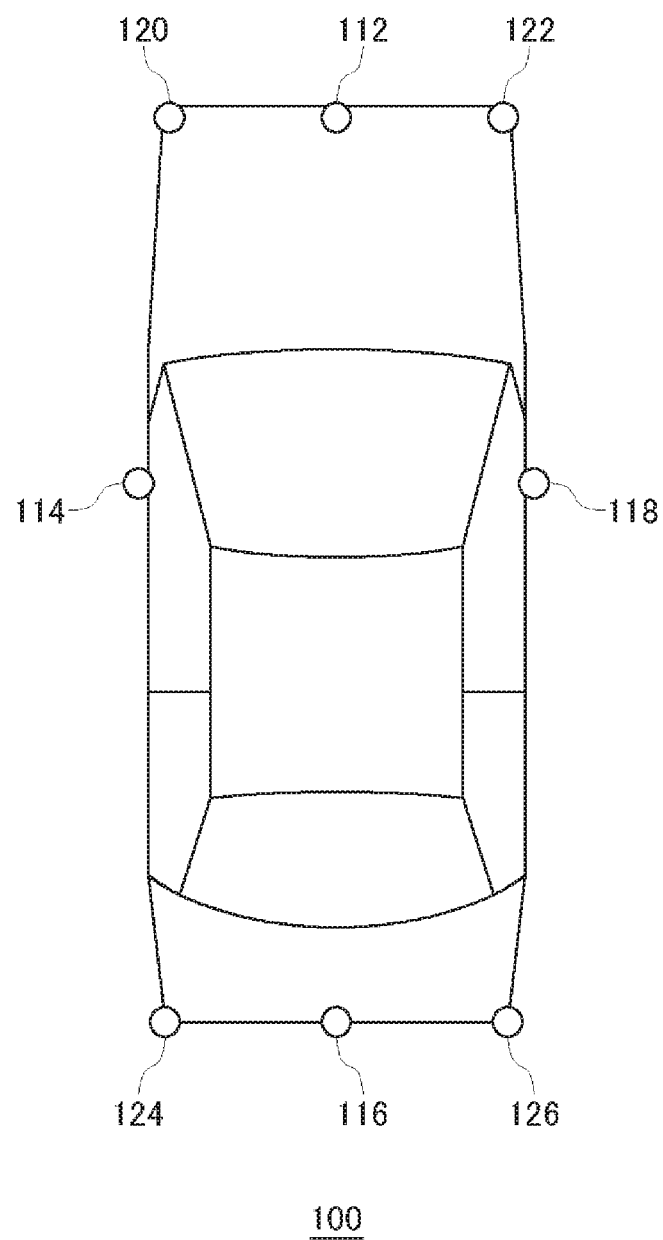
FIG. 2 shows sensors mounted on the vehicle of FIG. 1.

FIG. 2 shows sensors mounted on the vehicle 100. The vehicle 100 is provided with a front sensor 112, a left sensor 114, a rear sensor 116, a right sensor 118, a left front sensor 120, a right front sensor 122, a left rear sensor 124, and a right rear sensor 126. The left front sensor 120, the front sensor 112, and the right front sensor 122 are provided in the front portion of the vehicle 100. The left front sensor 120 is provided on the left side, the front sensor 112 is provided at the center, and the right front sensor 122 is provided on the right side. Further, the left sensor 114 is provided in the left portion of the vehicle 100, and the right sensor 118 is provided in the right portion of the vehicle 100. The left rear sensor 124, the rear sensor 116, and the right rear sensor 126 are provided in the rear portion of the vehicle 100. The left rear sensor 124 is provided on the left side, the rear sensor 116 is provided at the center, and the right rear sensor 126 is provided on the right side.

Figure 3:
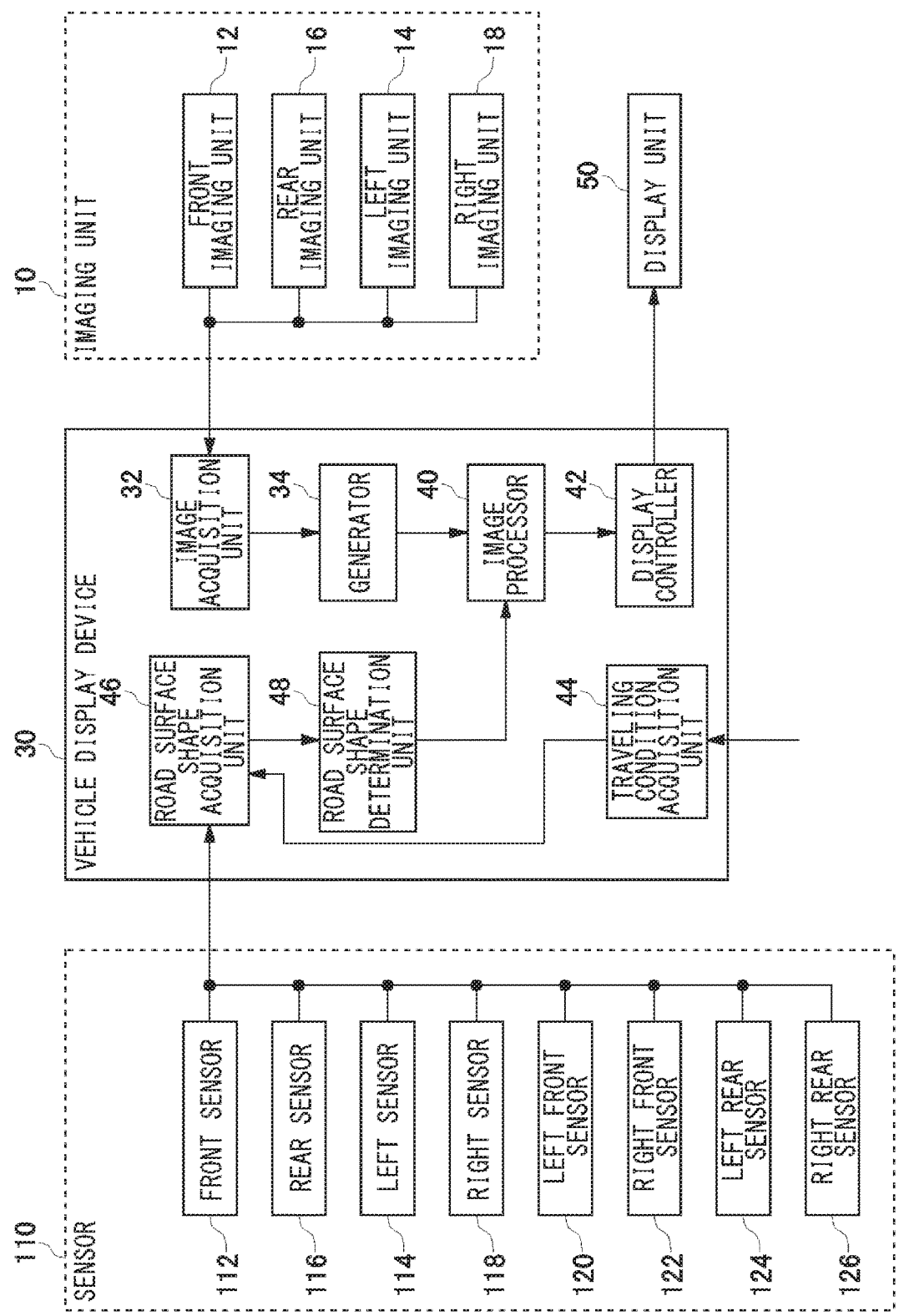
FIG. 3 shows a configuration of a vehicle display device mounted on the vehicle of FIG. 1.

FIG. 3 shows a configuration of a vehicle display device 30 mounted on the vehicle 100. The vehicle display device 30 is connected to an imaging unit 10, a display unit 50, and a sensor 110. The imaging unit 10 includes the front imaging unit 12, the left imaging unit 14, the rear imaging unit 16, and the right imaging unit 18. The sensor 110 includes the front sensor 112, the left sensor 114, the rear sensor 116, the right sensor 118, the left front sensor 120, the right front sensor 122, the left rear sensor 124, and the right rear sensor 126. The vehicle display device 30 includes an image acquisition unit 32, a generator 34, an image processor 40, a display controller 42, a traveling condition acquisition unit 44, a road surface shape acquisition unit 46, and a road surface shape determination unit 48.

As described above, the front imaging unit 12, the left imaging unit 14, the rear imaging unit 16, and the right imaging unit 18 capture images. The front imaging unit 12, the left imaging unit 14, the rear imaging unit 16, and the right imaging unit 18 output the images to the image acquisition unit 32. The image acquisition unit 32 receives the images from the front imaging unit 12, the left imaging unit 14, the rear imaging unit 16, and the right imaging unit 18. In other words, the image acquisition unit 32 acquires the images around the vehicle 100. The image acquisition unit 32 outputs the acquired images to the generator 34.

The generator 34 receives the images from the image acquisition unit 32. The generator 34 subjects the image to viewpoint transform to generate a bird's-eye image as viewed from above the vehicle 100. For transform, a publicly known technology may be used. For example, the pixels in the image may be projected onto a 3D curved surface in a virtual 3D space and a necessary region in the 3D curved surface is cut out in accordance with a virtual viewpoint above the vehicle 100. The cut-out region represents an image subjected to viewpoint transform.

Figure 4:
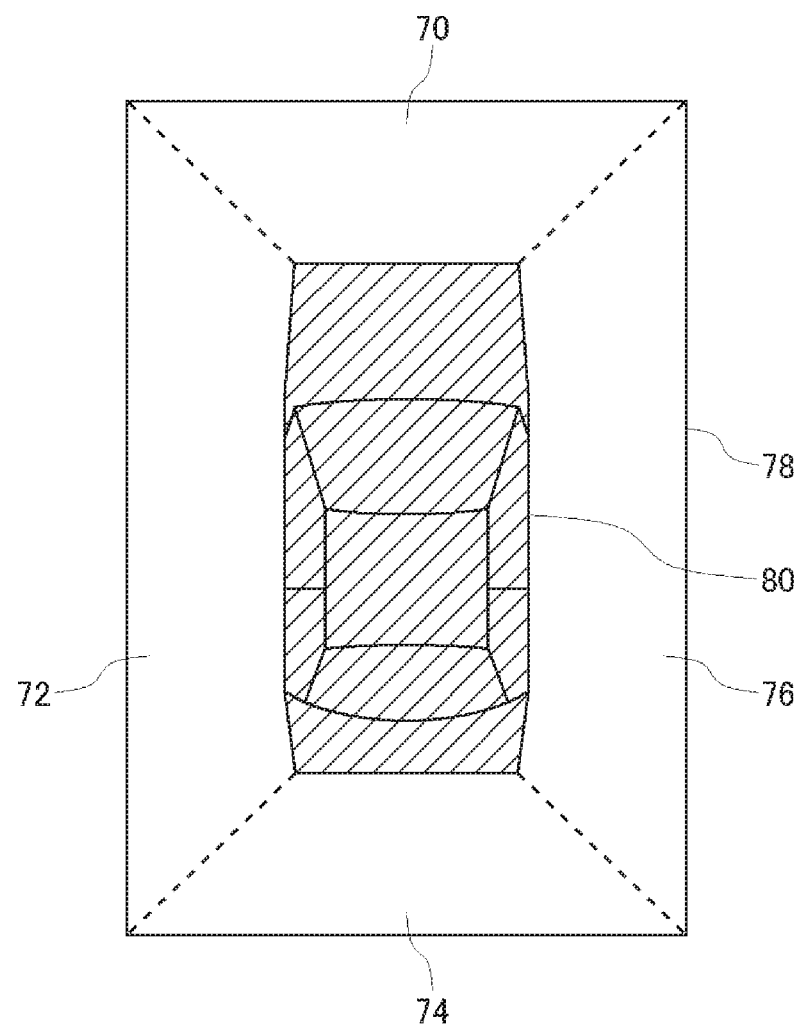
FIG. 4 shows a bird's-eye image generated by the generator of FIG. 3.

FIG. 4 shows a bird's-eye image 78 generated by the generator 34. A driver's vehicle icon 80 image indicating the vehicle 100 is located at the center of the bird's-eye image 78. The driver's vehicle icon 80 is an image of the vehicle 100 viewed from above and has a size of the vehicle 100 in the bird's-eye image 78. A front image 70 is located in front of the driver's vehicle icon 80, a left image 72 is located to the left of the driver's vehicle icon 80, a rear image 74 is located behind the driver's vehicle icon 80, and a right image 76 is located to the right of the driver's vehicle icon 80. Reference is made back to FIG. 3. The generator 34 outputs the bird's-eye image 78 to the image processor 40.

The traveling condition acquisition unit 44 acquires information related to the traveling condition from an Electronic Control Unit (ECU) via a Controller Area Network (CAN). An example of the information related to the traveling condition is information on the traveling speed of the vehicle 100. The traveling condition acquisition unit 44 outputs the information related to the traveling condition to the road surface shape acquisition unit 46.

The front sensor 112, the left sensor 114, the rear sensor 116, the right sensor 118, the left front sensor 120, the right front sensor 122, the left rear sensor 124, and the right rear sensor 126 are collectively referred to as the sensor 110. An existent technology such as that of infrared laser sensors and ultrasonic sensors may be applicable to the sensor 110. Where an infrared laser beam is used in the sensor 110, a predefined range is scanned by the infrared laser beam by means of a scan mirror, etc., and the distance to the road surface is acquired by referring to a phase difference in the reflected laser beam. Where ultrasonic waves are used in the sensor 110, an ultrasonic pulse is output to a predefined range, and the distance to the road surface is acquired by referring to the time difference from the reflected wave.

Figure 5:
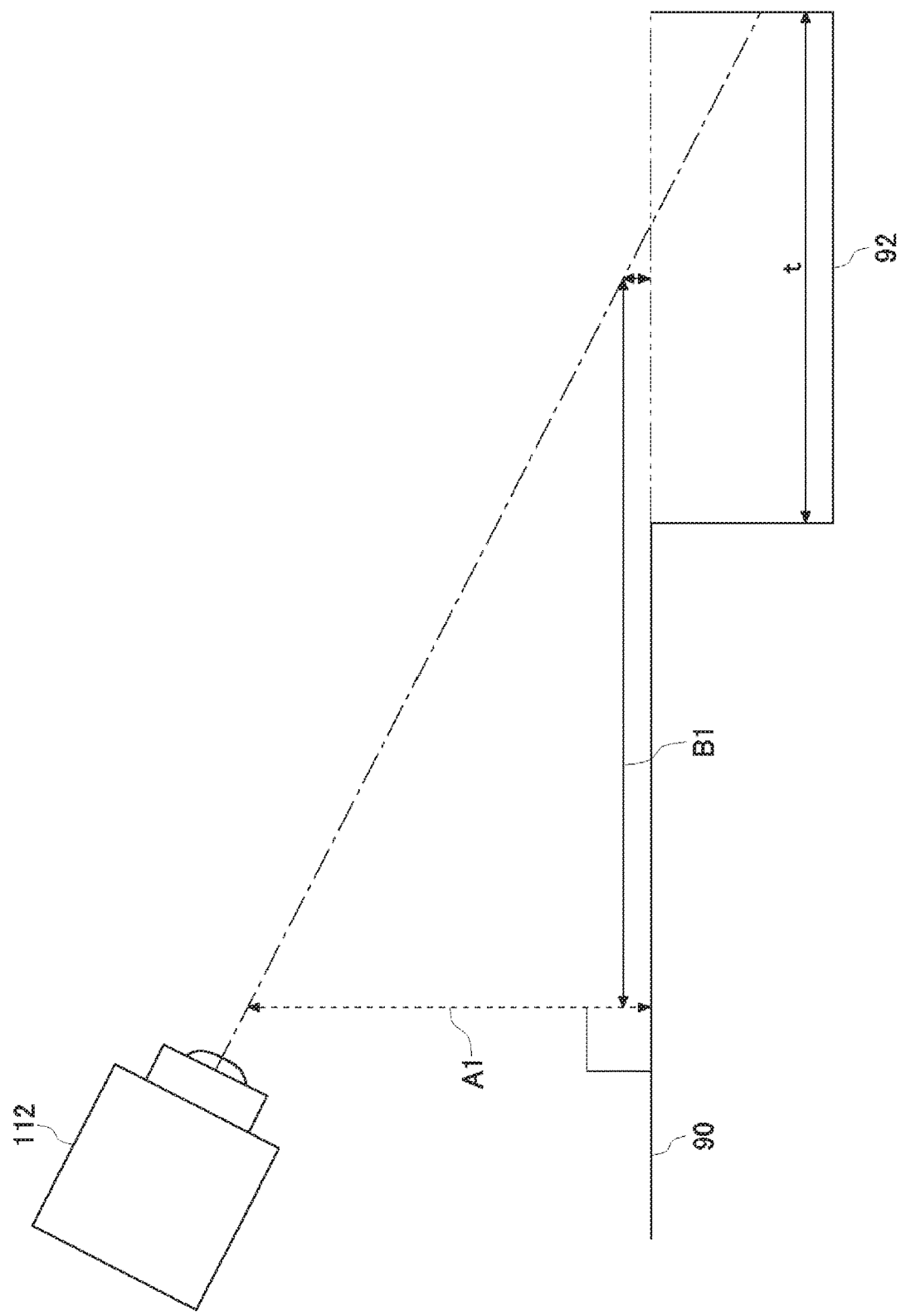
FIG. 5 shows an arrangement of the front sensor of FIG. 3.

FIG. 5 shows an arrangement of the front sensor 112. The front sensor 112 is used to detect whether a hole or a cliff is found in the direction of travel. The front sensor 112 is provided at a height "A1" from a road surface 90 and is provided to detect a distance "B1" from the vehicle 100 primarily. For example, the front sensor 112 is provided at a position near the bonnet at the front end of the vehicle 100. "B1" is set to be 2 m. As illustrated, if a ditch 92 with a width "t" is found at a distance "B1" ahead of the vehicle 100, the wall surface of the ditch 92 is detected. The left front sensor 120, the right front sensor 122, the left rear sensor 124, the rear sensor 116, and the right rear sensor 126 are similarly arranged. The left front sensor 120, the right front sensor 122, the left rear sensor 124, and the right rear sensor 126 are used to detect whether a hole or a cliff is found in the direction in which the vehicle 100 is turned.

Figure 6:
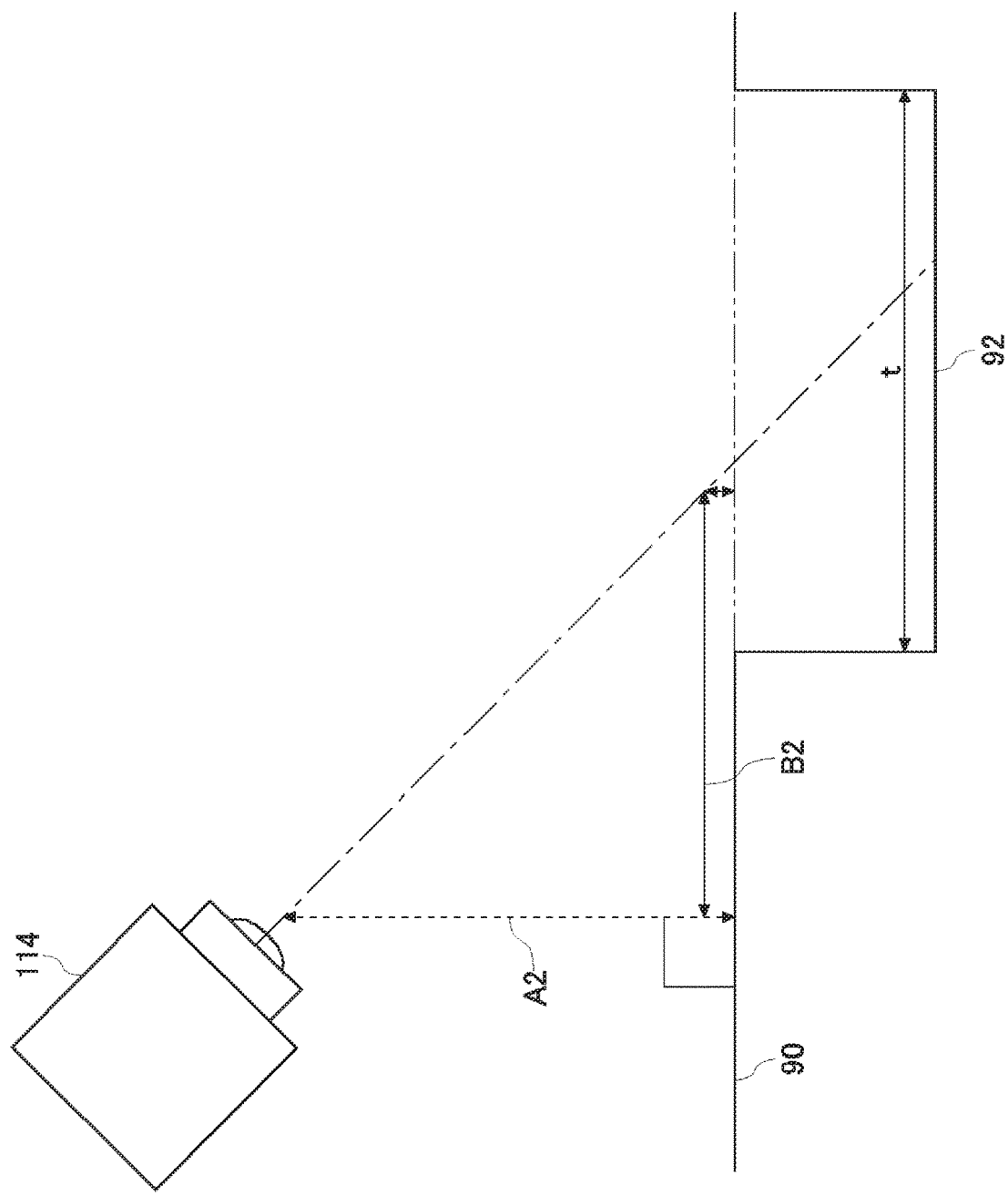
FIG. 6 shows an arrangement of the left sensor of FIG. 3.

FIG. 6 shows an arrangement of the left sensor 114. The left sensor 114 is used to detect whether a hole or a cliff is found to the left of the vehicle 100. The left sensor 114 is also used to detect whether a hole or a cliff is found at a position where a passenger of the vehicle 100 gets out from the left side of the vehicle 100. The left sensor 114 is provided at a height "A2" from the road surface 90 and is provided to detect a distance "B2" from the vehicle 100 primarily. For example, the left sensor 114 is provided above the door or in the door mirror. "B2" is set to be 10 cm. As illustrated, if a ditch 92 with a width "t" is found at a distance "B2" ahead of the vehicle 100, the bottom surface of the ditch 92 is detected. Thus, the higher the position where the left sensor 114 is provided, the easier it is to detect the depth of the ditch 92. Reference is made back to FIG. 3. The sensor 110 outputs the result of detection to the road surface shape acquisition unit 46.

Figure 7:
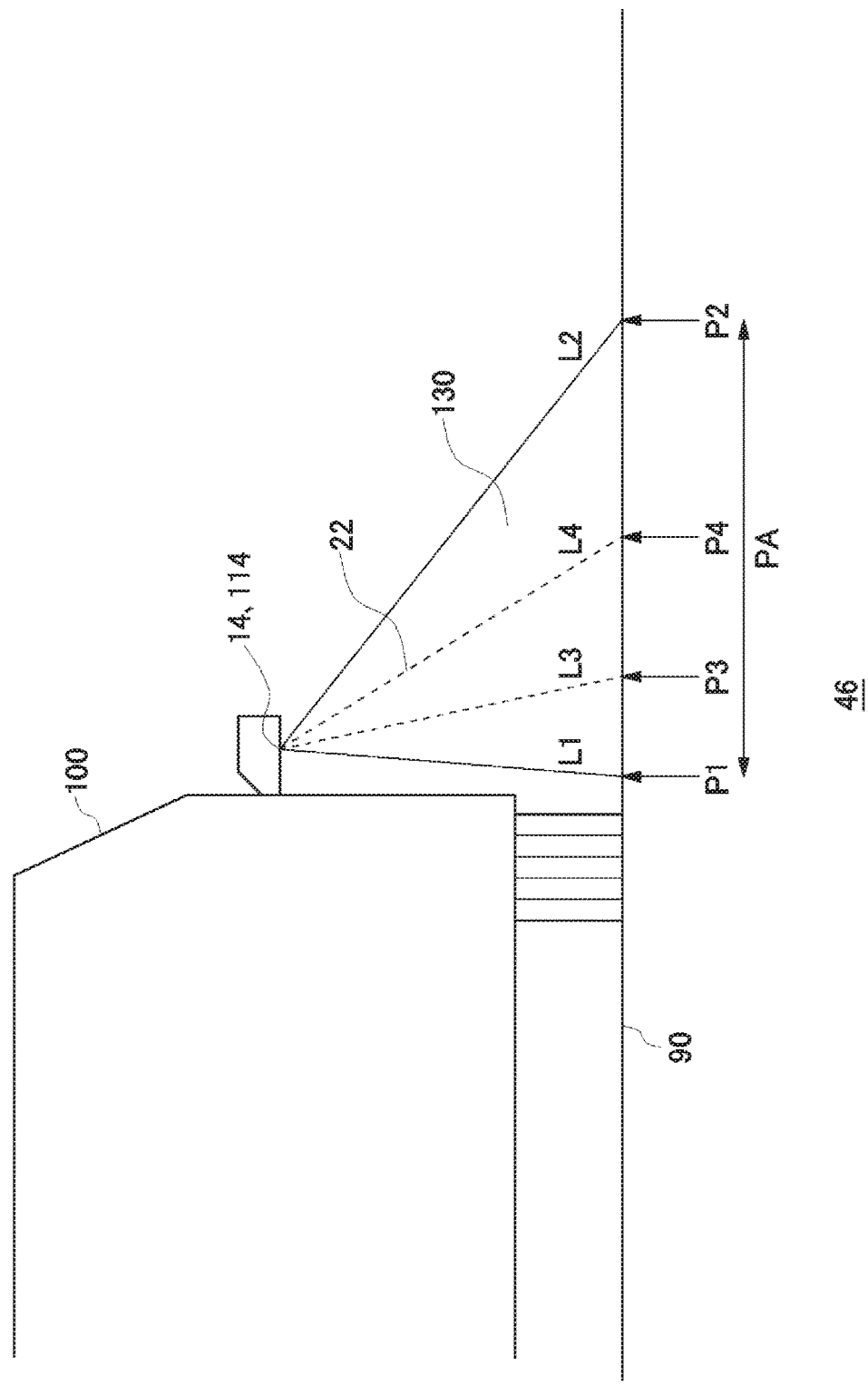
FIG. 7 shows a summary of a process in the road surface shape acquisition unit of FIG. 3.

The road surface shape acquisition unit 46 executes a function of acquiring the road surface shape by using a road surface information acquisition unit for acquiring information related to the road surface. The road surface shape acquisition unit 46 receives the result of detection from the sensor 110. The road surface shape acquisition unit 46 acquires data indicating the road surface shape around the vehicle 100 by analyzing the result of detection from the sensor 110. The data indicating the road surface shape includes position information in the detection range and distance information indicating a distance from the sensor 110. To describe it more specifically, the road surface shape acquisition unit 46 acquires the road surface shape by acquiring a distance from the vehicle body of the vehicle 100 to the road surface in a range in which it is possible to acquire the road surface shape. FIG. 7 shows a summary of a process in the road surface shape acquisition unit 46. For clarity, the left sensor 114 is shown to exemplify the sensor 110, and only the acquisition of the road surface shape in the transversal direction of the vehicle 100 by means of the left sensor 114 is illustrated. In practice, the left sensor 114 is also used to acquire the road surface shape in the longitudinal direction of the vehicle 100, and the road surface shape acquired in the transversal direction and the road surface shape acquired in the longitudinal direction are combined.

The left imaging unit 14 and the left sensor 114 are mounted to the left door mirror of the vehicle 100. The left imaging unit 14 captures images in the left imaging area 22, and the left sensor 114 measures a distance in a left detection region 130. The left detection region 130 is a range in which it is possible for the left sensor 114 to acquire the road surface shape and is represented as an area "PA" from point P1 to point P2. Point P3 and point P4 are shown as intermediate points included in the area "PA". The intermediate points are not limited to point P3 and point P4. The figure also shows a distance L1 to point P1, a distance L2 to point P2, a distance L3 to point P3, and a distance L4 to point P4. Given this situation, the data indicating the road surface shape includes a combination of point P1 and the distance L1, a combination of point P2 and the distance L2, a combination of point P3 and the distance L3, and a combination of point P4 and the distance L4.

Figure 8:
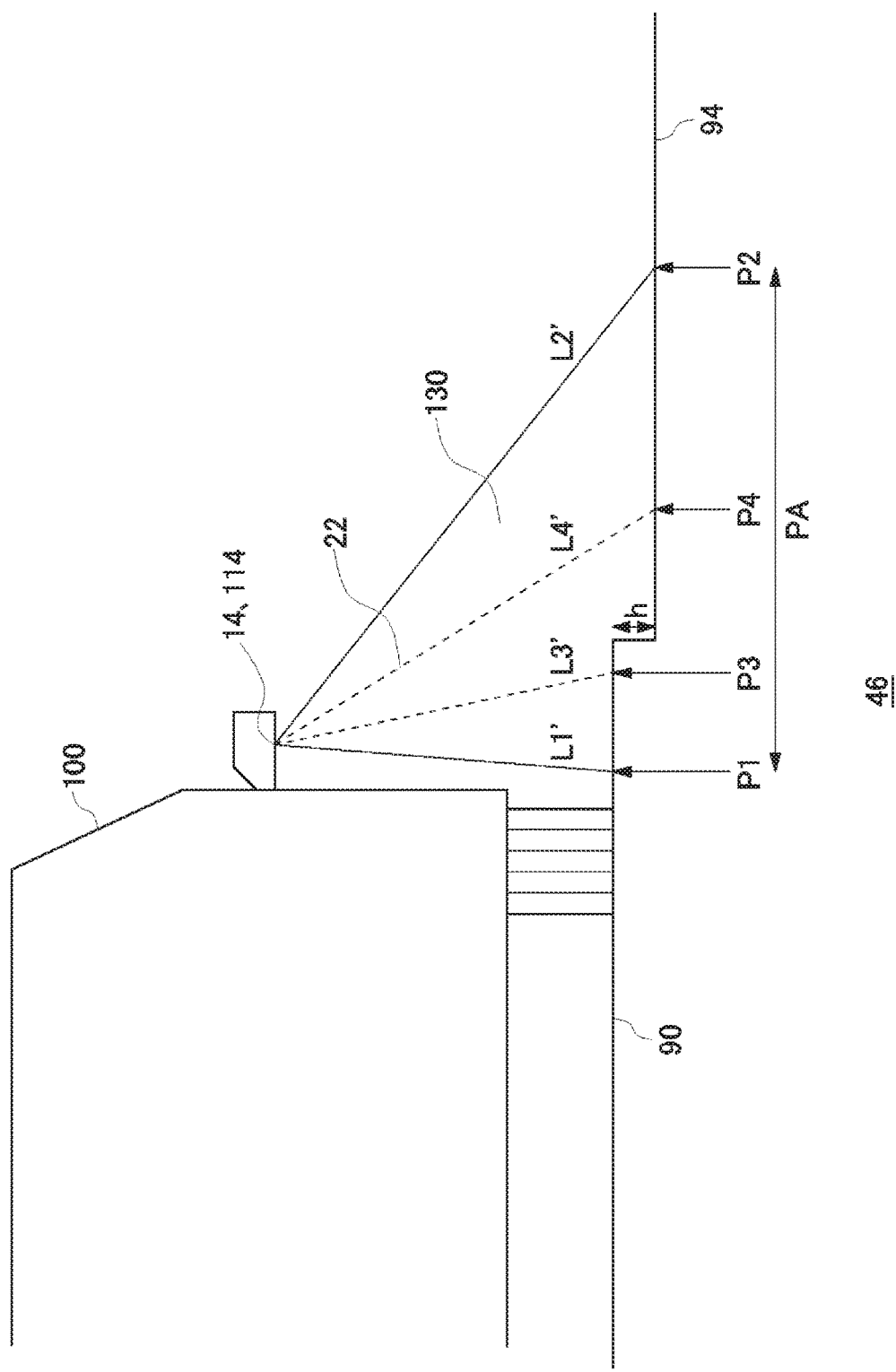
FIG. 8 shows a summary of another process in the road surface shape acquisition unit of FIG. 3.

FIG. 8 shows a summary of another process in the road surface shape acquisition unit 46. A downward step 94 that descends by a height of "h" from the road surface 90 is found. The figure shows a distance L1' to point P1, a distance L2' to point P2, a distance L3' to point P3, and a distance L4' to point P4. Therefore, the data indicating the road surface shape includes a combination of point P1 and the distance L1', a combination of point P2 and the distance L2', a combination of point P3 and the distance L3', and a combination of point P4 and the distance L4'. The data defines the road surface shape as shown in FIG. 8.

Figure 9:
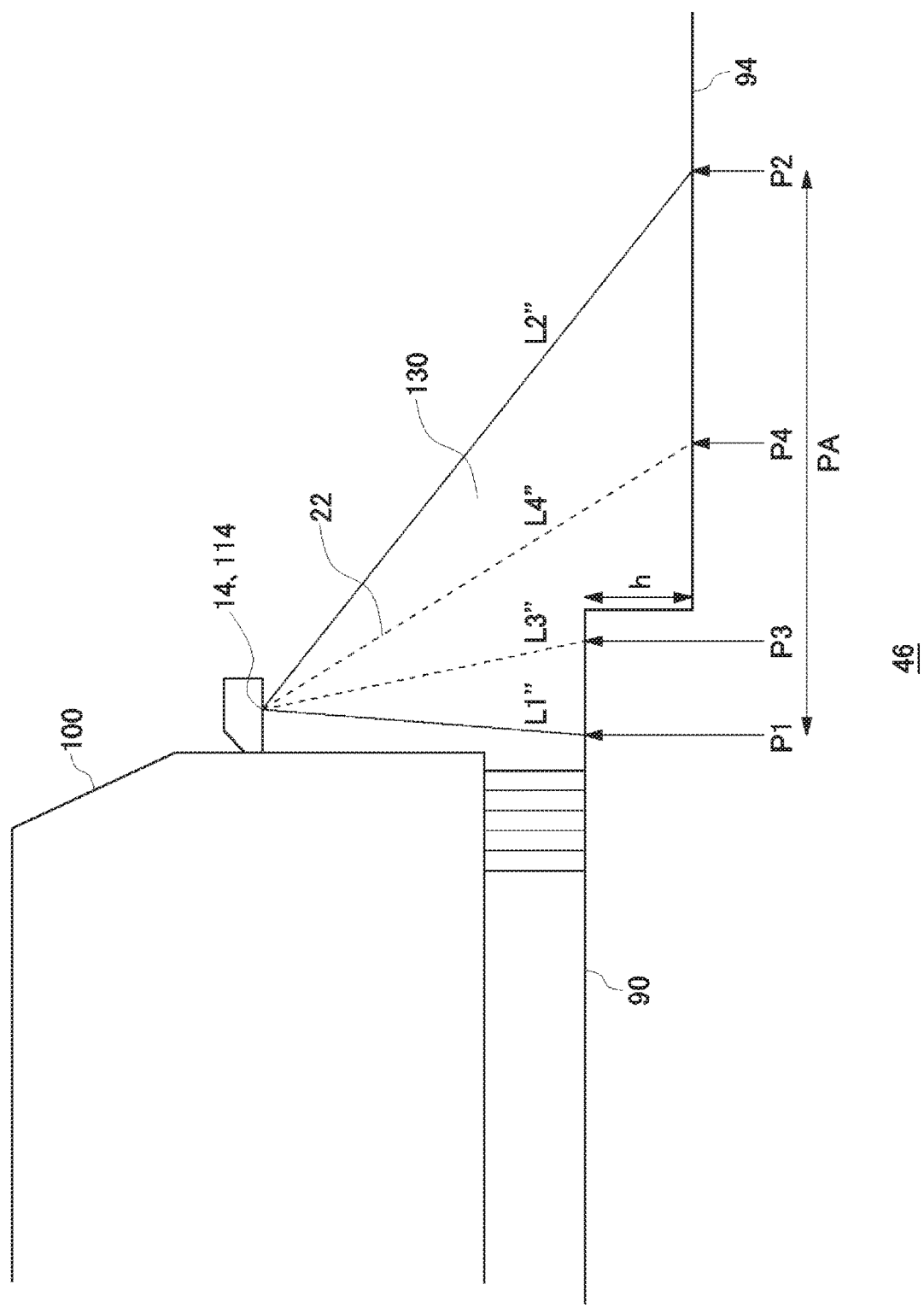
FIG. 9 shows a summary of a still another process in the road surface shape acquisition unit of FIG. 3.

FIG. 9 shows a summary of a still another process in the road surface shape acquisition unit 46. A downward step 94 that descends by a height of "h" from the road surface 90 is found. It is assumed that "h" in FIG. 9 is larger than "h" in FIG. 8. In other words, the step in FIG. 9 is larger than the step in FIG. 8. The figure shows a distance L1" to point P1, a distance L2" to point P2, a distance L3" to point P3, and a distance L4" to point P4. Therefore, the data indicating the road surface shape includes a combination of point P1 and the distance L1", a combination of point P2 and the distance L2", a combination of point P3 and the distance L3", and a combination of point P4 and the distance L4". The data defines the road surface shape as shown in FIG. 9. Reference is made back to FIG. 3.

The road surface shape acquisition unit 46 receives the information related to the traveling condition from the traveling condition acquisition unit 44. The road surface shape acquisition unit 46 acquires the data indicating the road surface shape as described above, when the vehicle is traveling below a predetermined speed or at a stop. This is equivalent to acquiring the road surface shape around the vehicle 100. Meanwhile, the road surface shape acquisition unit 46 does not acquire the data indicating the road surface shape if the vehicle is traveling at a speed higher than the predetermined speed. When the road surface shape acquisition unit 46 acquires the data indicating the road surface shape, the road surface shape acquisition unit 46 outputs the data indicating the road surface shape to the road surface shape determination unit 48.

The road surface shape determination unit 48 refers to the information related to the road surface and determines whether a road surface shape that requires attention is found by using a road surface determination unit for determining whether a road surface shape that requires attention is found. The road surface shape determination unit 48 receives the data indicating the road surface shape from the road surface shape acquisition unit 46. The road surface shape determination unit 48 refers to the road surface shape indicated by the data received from the road surface shape acquisition unit 46 to determine whether a road surface shape that requires attention is found. A road surface shape that requires attention is exemplified by a ditch 92 having a predetermined width of more and a step having a predetermined step height or more. The ditch 92 with a large width is equivalent to a downward step. For determination as to whether there is a road surface shape that requires attention, the road surface shape determination unit 48 stores a reference pattern of the road surface shape that requires attention in a table.

FIG. 10 shows a data structure of a table stored in the road surface shape determination unit 48. If a difference between distances between adjacent points is equal to or larger than a threshold value, it is recognized that there is a step on the road surface 90. The difference that occurs then is acquired as a height h. The height h is defined as a parameter for a case where the road surface shape is an upward step or a downward step. If the road surface shape is the ditch 92, the ditch width t is defined as a parameter. If a difference between distances L between adjacent points is smaller than the threshold value, it is recognized that the road surface 90 is a plane or a slope.

In this case, the process in the road surface shape determination unit 48 is not performed. Thus, it is recognized that a step is found if the distance L varies discretely and that a step is not found if the distance L varies continuously.

"Safe", "Drive carefully", and "Don't drive" are defined depending on the parameter value. The ranges of parameter values for "Safe", "Drive carefully", and "Don't drive" are determined based on the shape of the vehicle 100, and, in particular, at least the ground height, tire width, etc. Thus, the road surface shape determination unit 48 determines whether a road surface shape that requires attention is found by determining whether a road surface shape having a step height that makes it difficult for the vehicle 100 to travel is found. In particular, the road surface shape determination unit 48 determines whether a step shaped to descend in a direction away from the vehicle 100 is found to identify a road surface shape having a step height that makes it difficult for the vehicle 100 to travel. Reference is made back to FIG. 3.

The road surface shape determination unit 48 refers to the table shown in FIG. 10 and designates "Safe", "Drive carefully", or "Don't drive", based on the road surface shape indicated by the data received from the road surface shape acquisition unit 46. In this process, the road surface shape determination unit 48 identifies position information on the step or the ditch 92 for which "Safe", "Drive carefully", or "Don't drive" is designated. The road surface shape determination unit 48 outputs information designating "Safe", "Drive carefully", or "Don't drive" (hereinafter, referred to as "designation result") and the position information on the designated step or ditch 92 to the image processor 40.

Figure 11:
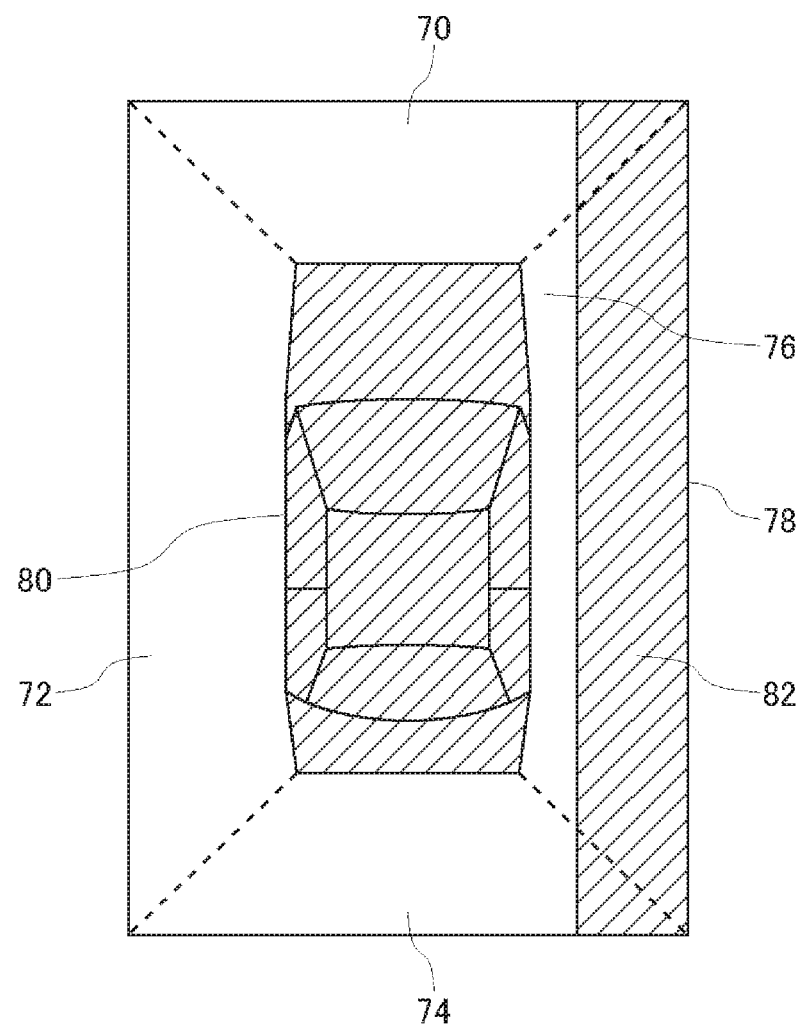
FIG. 11 show the bird's-eye image generated by the image processor of FIG. 3.

The image processor 40 receives the bird's-eye image 78 from the generator 34 and receives the designation result and the position information from the road surface shape determination unit 48. If the designation result is "Drive carefully" or "Don't drive", i.e., if it is determined that there is a road surface shape that requires attention, the image processor 40 superimposes an image showing the road surface shape that requires attention on the bird's-eye image 78. FIG. 11 show the bird's-eye image 78 generated by the image processor 40. This shows a case where the designation result is "Drive carefully". The image processor 40 generates a "Drive carefully" notification image 82 that should be displayed in a region that forms a part of the bird's-eye image 78 and includes the position information. The "Drive carefully" notification image 82 is an image to indicate "Drive carefully". The image processor 40 superimposes the "Drive carefully" notification image 82 in the relevant region in the bird's-eye image 78. In this case, the "Drive carefully" notification image 82 is provided to the right of the driver's vehicle icon 80.

Figure 12:
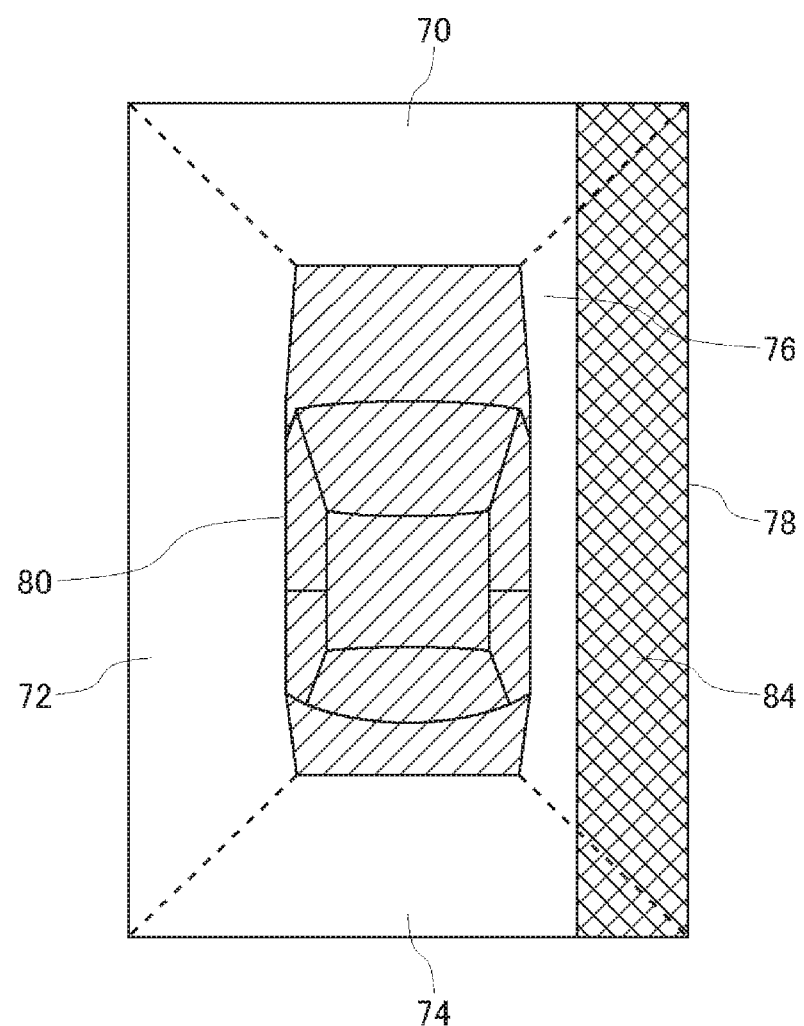
FIG. 12 shows another bird's-eye image generated by the image processor of FIG. 3.

FIG. 12 shows another bird's-eye image 78 generated by the image processor 40. This shows a case where the designation result is "Don't drive". The image processor 40 generates a "Don't drive" notification image 84 that should be displayed in a region that forms a part of the bird's-eye image 78 and includes the position information. The "Don't drive" notification image 84 is an image to indicate "Don't drive". The image processor 40 superimposes the "Don't drive" notification image 84 in the relevant region in the bird's-eye image 78. In this case, the "Don't drive" notification image 84 is provided to the right of the driver's vehicle icon 80. Reference is made back to FIG. 3. The image processor 40 outputs the bird's-eye image 78 on which the "Drive carefully" notification image 82 or the "Don't drive" notification image 84 is superimposed or the bird's-eye image 78 on which neither the "Drive carefully" notification image 82 nor the "Don't drive" notification image 84 is superimposed to the display controller 42.

The display controller 42 receives the bird's-eye image 78 from the image processor 40. The display controller 42 causes the display unit 50 to display the bird's-eye image 78 by performing a process of displaying the bird's-eye image 78. The display unit 50 may be a display panel. When the "Drive carefully" notification image 82 or the "Don't drive"

notification image 84 is superimposed on the bird's-eye image 78, the display unit 50 displays the bird's-eye image 78 as shown in FIG. 11 or FIG. 12.

Figure 13:
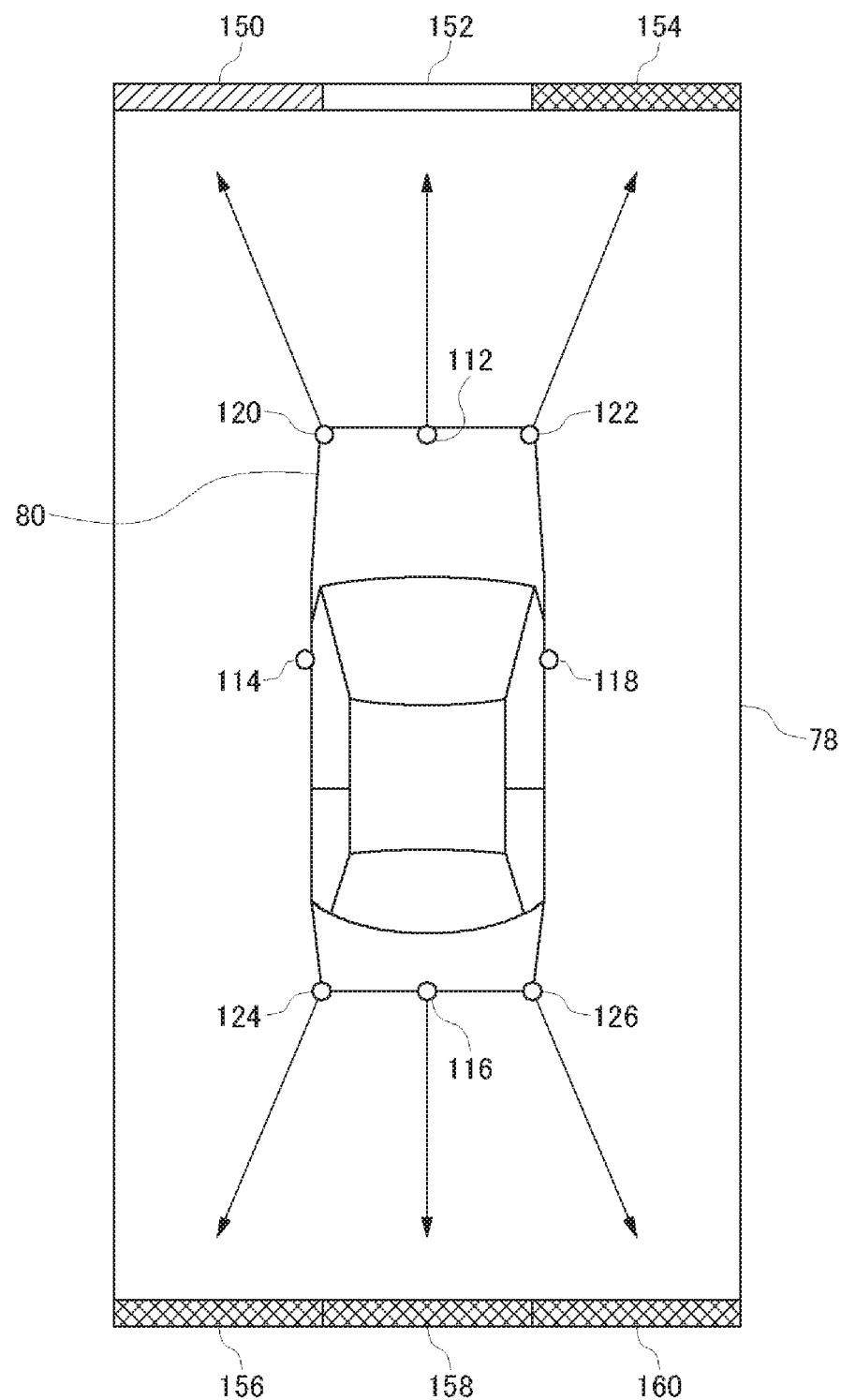
FIG. 13 shows still another bird's-eye image generated by the image processor of FIG. 3.

A description will be given of various examples of bird's-eye images 78 in which an image is superimposed by the image processor 40. FIG. 13 shows still another bird's-eye image 78 generated by the image processor 40. The vehicle 100 is traveling forward. The bird's-eye image 78 shows a left front notification image 150, a front notification image 152, a right front notification image 154, a left rear notification image 156, a rear notification image 158, and a right rear notification image 160. The left front notification image 150, the front notification image 152, and the right front notification image 154 are provided in front of the drive's vehicle icon 80. The left rear notification image 156, the rear notification image 158, and the right rear notification image 160 are provided behind the driver's vehicle icon 80.

The left front notification image 150 is an image to show whether the result of detection by the left front sensor 120 is "No steps", "Step", or "Cliff". "Step" corresponds to "Don't drive" discussed above, "No steps" corresponds to "Drive carefully" or "Safe" discussed above, "Cliff" corresponds to "Step" with a height h of "30 cm" or higher. "Cliff" includes a case where the sensor 110 is not in operation.

Similarly, the front notification image 152, the right front notification image 154, the left rear notification image 156, the rear notification image 158, and the right rear notification image 160 show the results of detection by the front sensor 112, the right front sensor 122, the left rear sensor 124, the rear sensor 116, and the right rear sensor 126, respectively. By way of one example, the left front notification image 150 shows "No steps", the front notification image 152 shows "Step", and the right front notification image 154 through the right rear notification image 160 shows "Cliff". While the vehicle 100 is traveling forward, the left rear notification image 156 through the right rear notification image 160 also show "Cliff" if he left rear sensor 124, the rear sensor 116, and the right rear sensor 126 for detecting of condition behind are not in operation.

Figure 14:
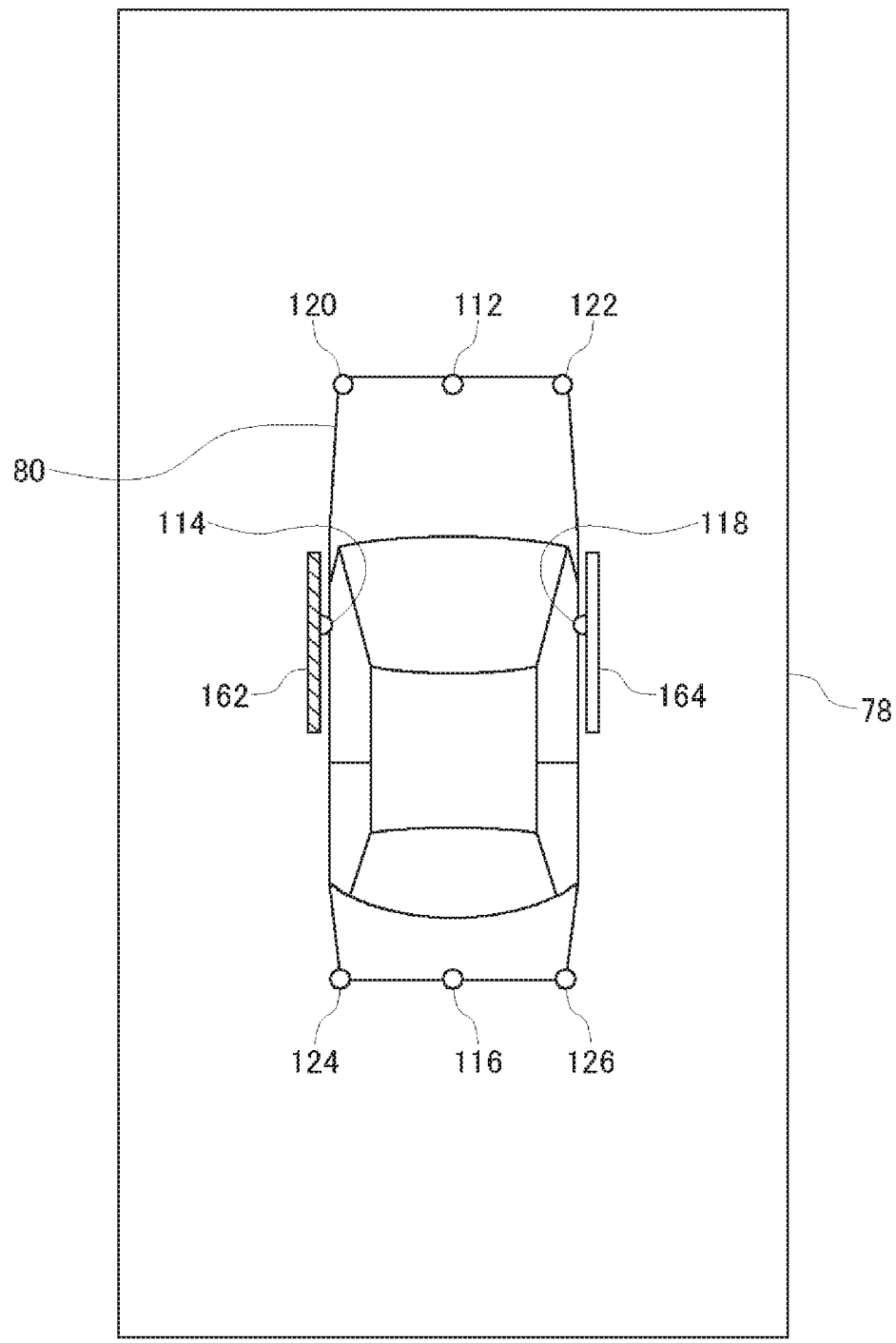
FIG. 14 shows still another bird's-eye image generated by the image processor of FIG. 3.

FIG. 14 shows still another bird's-eye image 78 generated by the image processor 40. When the speed of the vehicle 100 drops to 4-5 km per hour or less, for example, a left notification image 162 and a right notification image 164 are arranged in the bird's-eye image 78 instead of the left front notification image 150, etc. of FIG. 13. The left notification image 162 is provided to the left of the drive's vehicle icon 80, and the right notification image 164 is provided to the right of the driver's vehicle icon 80. The left notification image 162 is an image to show whether the result of detection by the left sensor 114 is "No steps", "Step", or "Cliff". Similarly, the right notification image 164 shows the result of detection by the right sensor 118. By way of one example, the left notification image 162 shows "Cliff" and the right notification image 164 shows "Step".

Figure 15:
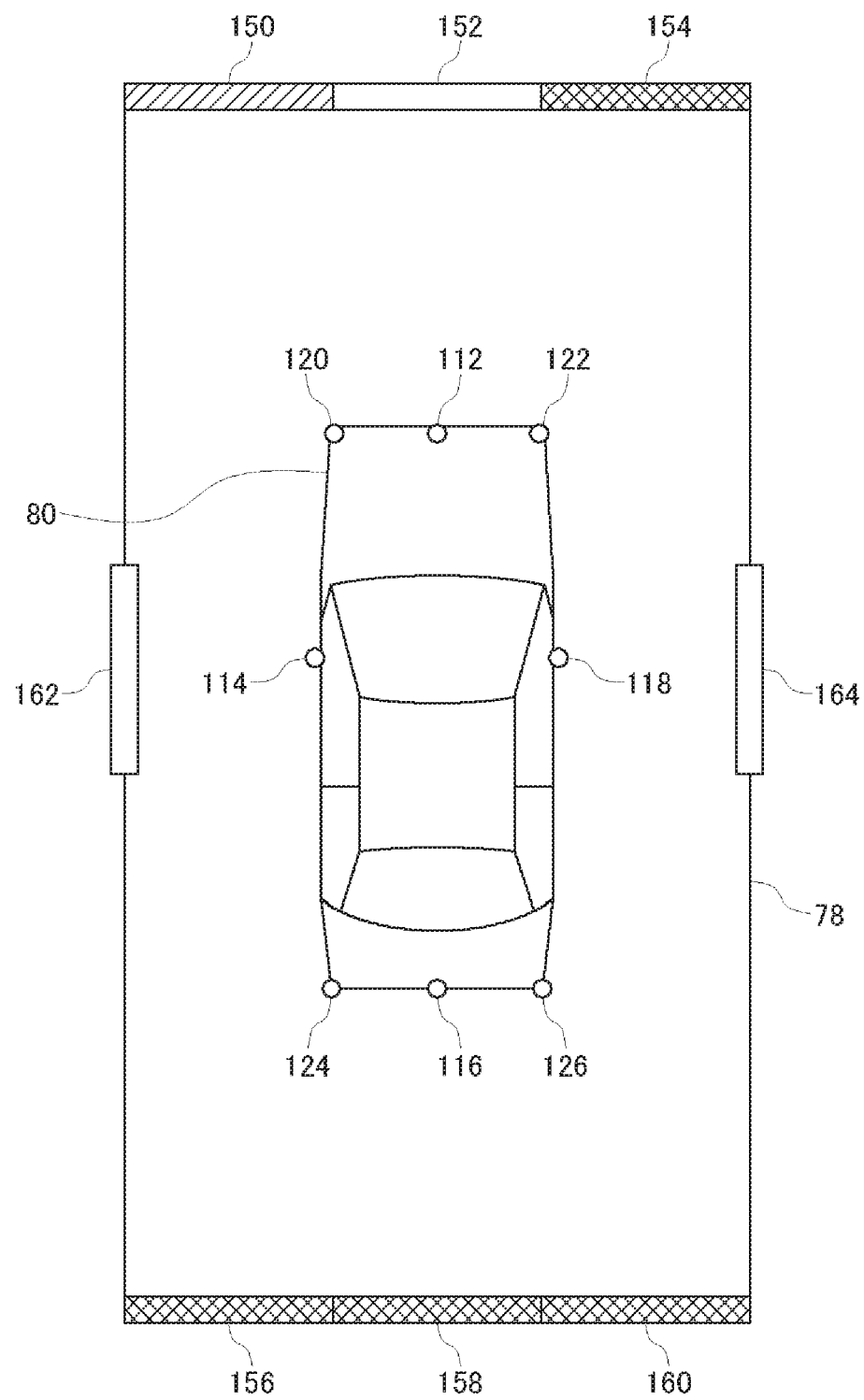
FIG. 15 shows still another bird's-eye image generated by the image processor of FIG. 3.

FIG. 15 shows still another bird's-eye image 78 generated by the image processor 40. In this case, the left front notification image 150 through the right rear notification image 160, the left notification image 162, and the right notification image 164 are shown. The image of FIG. 15 is shown in a situation similar to that of FIG. 13.

Figure 16A:
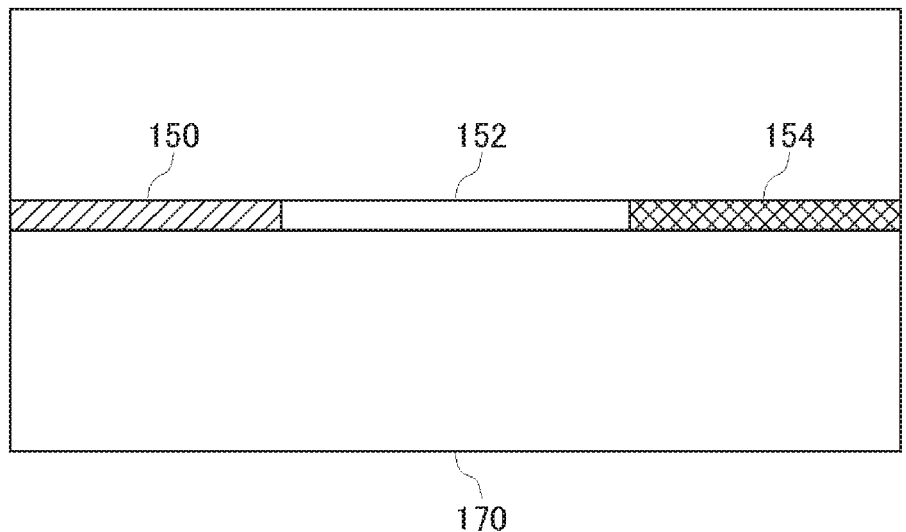
FIG. 16A and FIG. 16B show images generated by the image processor of FIG. 3.
Figure 16B:
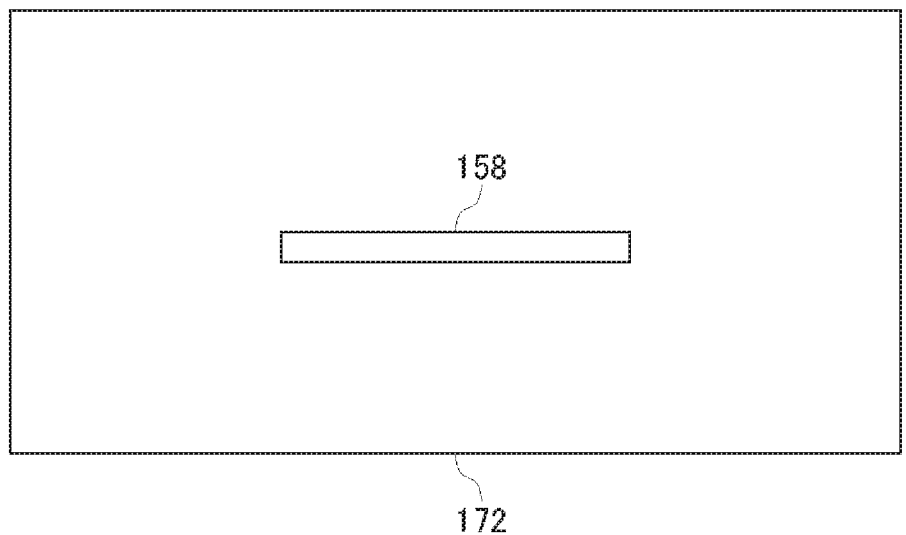

FIGS. 16A-16B show images generated by the image processor 40. The image processor 40 has been described so far as superimposing an image indicating a road surface shape that requires attention on the bird's-eye image 78. In this case, an image showing the road surface shape that requires attention is superimposed on an image captured by the imaging unit 10. In FIG. 16A, the left front notification image 150, the front notification image 152, and the right front notification image 154 are arranged in a front image 170 captured by the front imaging unit 12. The left front notification image 150, the front notification image 152, and the right front notification image 154 are as described above. In FIG. 16B, the rear notification image 158 is arranged in a rear image 172 captured by the rear imaging unit 16. The rear notification image 158 is as described above.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only, software only, or by a combination of hardware and software.

Figure 17:
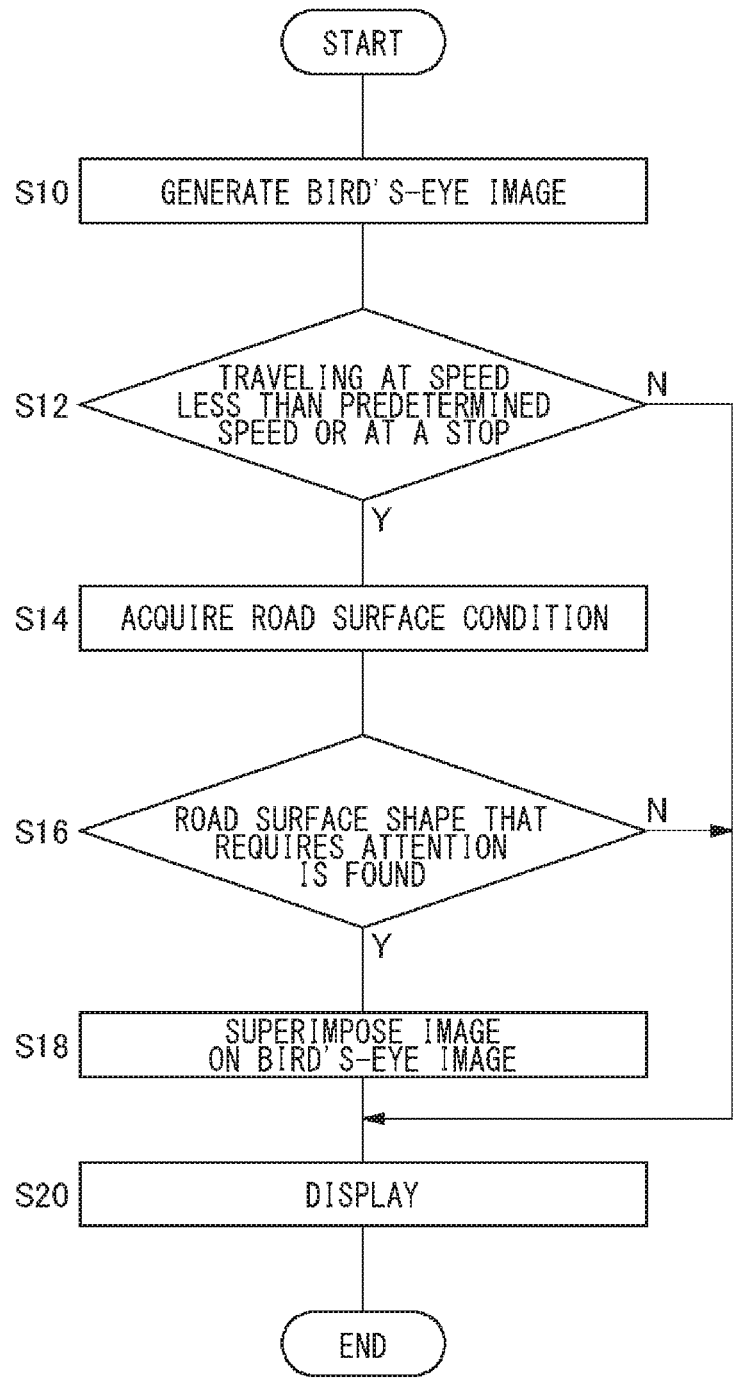
FIG. 17 is a flowchart showing the steps for display performed by the vehicle display device of FIG. 3.

A description will now be given of the operation of the vehicle display device 30 with the above features. FIG. 17 is a flowchart showing the steps for display performed by the vehicle display device 30. The generator 34 generates the bird's-eye image 78 (S10). When the vehicle is traveling at a speed less than a predetermined speed or is at a stop (Y in S12), the road surface shape acquisition unit 46 acquires the road surface shape (S14). When a road surface shape that requires attention is found (Y in S16), the image processor 40 superimposes the image on the bird's-eye image 78 (S18). The display unit 50 displays the bird's-eye image 78 (S20). When the vehicle is neither traveling at a speed less than the predetermined speed nor is at a stop (N in S12), or when a road surface shape that requires attention is not found (N in S16), steps through step 20 are skipped.

According to this embodiment, when it is determined that a road surface shape that requires attention is found, the image showing the road surface shape that requires attention is superimposed on the bird's-eye image so that an alert of the road surface shape that requires attention can be output. Since an alert of the road surface shape that requires attention is output, it is possible to know whether there is a step in the bird's-eye image as well. The road surface shape is acquired by acquiring the distance from the vehicle body of the vehicle to the road surface in a range in which it is possible to acquire the road surface shape. Therefore, the distance measured by the sensor can be used.

Further, since the road surface shape around the vehicle is acquired when the vehicle is traveling at a speed less than a predetermined speed or is at a stop, a step or a cliff found at a short distance from the vehicle can be made known. Further, a determination is made as to whether a road surface shape having a step height that makes it difficult for the vehicle to travel is found to identify a road surface shape that requires attention. It is therefore possible to detect a step that is difficult to be captured in the bird's-eye image. Since a determination is made as to whether a step shaped to descend in a direction away from the vehicle is found. It is therefore possible to make known the presence of a step that is particularly difficult to be captured in the bird's-eye image.

Embodiment 2

A description will now be given of Embodiment 2. Like Embodiment 1, Embodiment 2 relates to a vehicle display device that displays a bird's-eye image showing whether there is a step. The description of Embodiment 2 is particularly directed to a case where there is a road surface shape having a step height that requires attention when the vehicle door is opened. The vehicle 100 according to Embodiment 2 is of the same type as that of FIGS. 1 and 2. The following description concerns a difference from the foregoing description.

Figure 18:
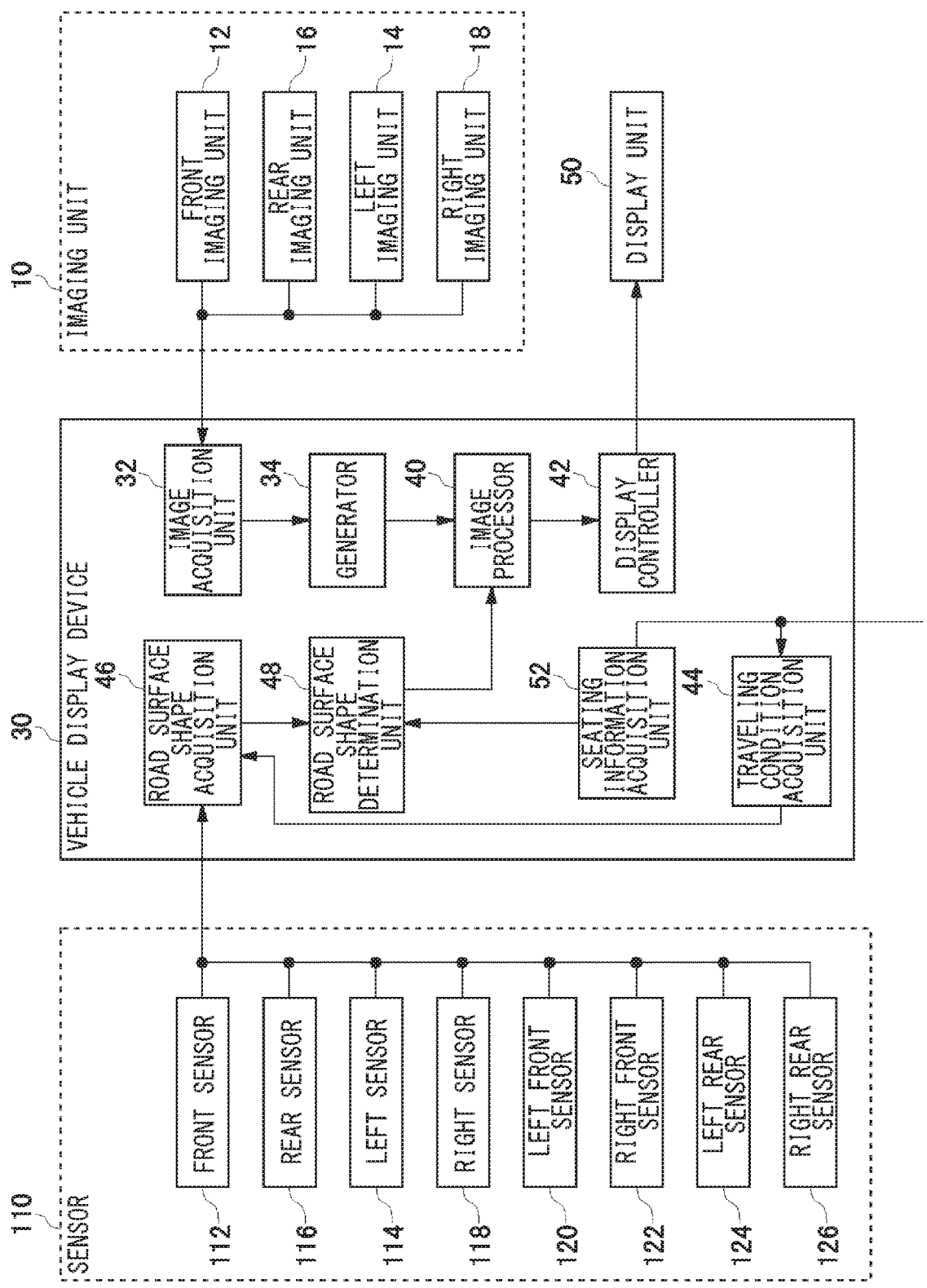
FIG. 18 shows a configuration of the vehicle display device according to Embodiment 2.

FIG. 18 shows a configuration of the vehicle display device 30 according to Embodiment 2. In the vehicle display device 30, a seating information acquisition unit 52 is added to the vehicle display device 30 of FIG. 3. The seating information acquisition unit 52 is connected to a seating sensor (not shown) provided in each of the plurality of seats in the vehicle 100 and receives results of detection from the seating sensors. A publicly known technology may be used in the seating sensors. The results of detection from the seating sensors indicate whether a passenger is seated at the seat and can be said to be seated/non-seated information. The seating information acquisition unit 52 identifies the seat occupied by a passenger by referring to the seated/non-seated information. The seating information acquisition unit 52 outputs information related to the seat in which the passenger is seated to the road surface shape determination unit 48.

Figure 19:
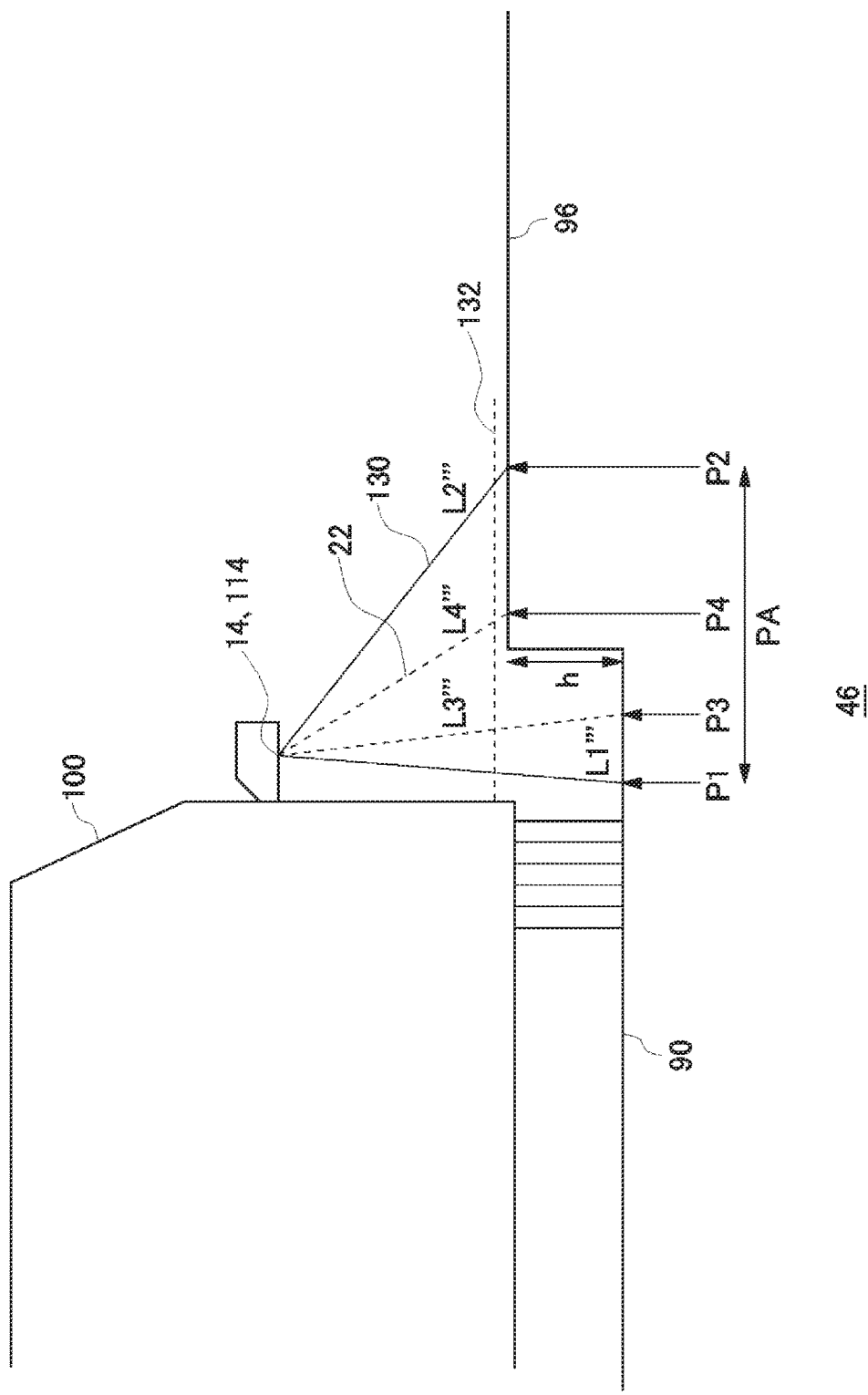
FIG. 19 shows a summary of a process in the road surface shape acquisition unit of FIG. 18.

As in the cases described above, the road surface shape acquisition unit 46 acquires the data indicating the road surface shape around the vehicle 100 by analyzing the results of detection from the sensor 110. However, the road surface shape assumed in the description is different from those already discussed. FIG. 19 shows a summary of a process in the road surface shape acquisition unit 46. An upward step 96 that ascends by a height of "h" from the road surface 90 is found. A lower end line 132 defined when the door is opened or closed is a line traced by the lower end of the door when the door of the vehicle 100 is opened or closed.

The figure shows a distance L1''' to point P1, a distance L2''' to point P2, a distance L3''' to point P3, and a distance L4''' to point P4. Therefore, the data indicating the road surface shape includes a combination of point P1 and the distance L1''', a combination of point P2 and the distance L2''', a combination of point P3 and the distance L3''', and a combination of point P4 and the distance L4'''. The data defines the road surface shape as shown in FIG. 19. Reference is made back to FIG. 18. When the road surface shape acquisition unit 46 acquires the data indicating the road surface shape, the road surface shape acquisition unit 46 outputs the data indicating the road surface shape to the road surface shape determination unit 48.

The road surface shape determination unit 48 receives the data indicating the road surface shape from the road surface shape acquisition unit 46. Further, the road surface shape determination unit 48 receives the information related to the seat in which the passenger is seated from the seating information acquisition unit 52. The road surface shape determination unit 48 refers to the road surface shape indicated by the data received from the road surface shape acquisition unit 46 to determine whether a road surface shape that requires attention is found by determining whether a road surface shape having a step height that makes it difficult to open the door of the vehicle 100 is found. In particular, the road surface shape determination unit 48 determines whether a road surface shape having a step height that makes it difficult to open one of the doors of the vehicle 100 that is adjacent to the seat acquired by the seating information acquisition unit 52 is found. As in the cases described above, the road surface shape determination unit 48 stores a reference pattern of the road surface shape that requires attention in the form of a table, for determination as to whether a road surface shape that requires attention is found.

FIG. 20 shows a data structure of the table stored in the road surface shape determination unit 48. When the road surface shape is an upward step, the height h is defined as a parameter. "Safe", "Open the door carefully", and "Don't open the door" are defined depending on the parameter value. "Open the door carefully" is defined for a case where the height h approaches a value derived by subtracting about 5-10 cm from ground height of the lower end line 132 defined when an adult person (e.g.,: weighing 70-100 kg) is seated at the seat corresponding to the door. Reference is made back to FIG. 18.

The road surface shape determination unit 48 refers to the table shown in FIG. 20 and designates "Safe", "Open the door carefully", or "Don't open the door" for the door near the seat in which the passenger is seated, based on the road surface shape indicated by the data received from the road surface shape acquisition unit 46. The road surface shape determination unit 48 outputs information designating "Safe", "Open the door carefully", or "Don't open the door" (hereinafter, referred to as "designation result") and information on the door to the image processor 40.

Figure 21:
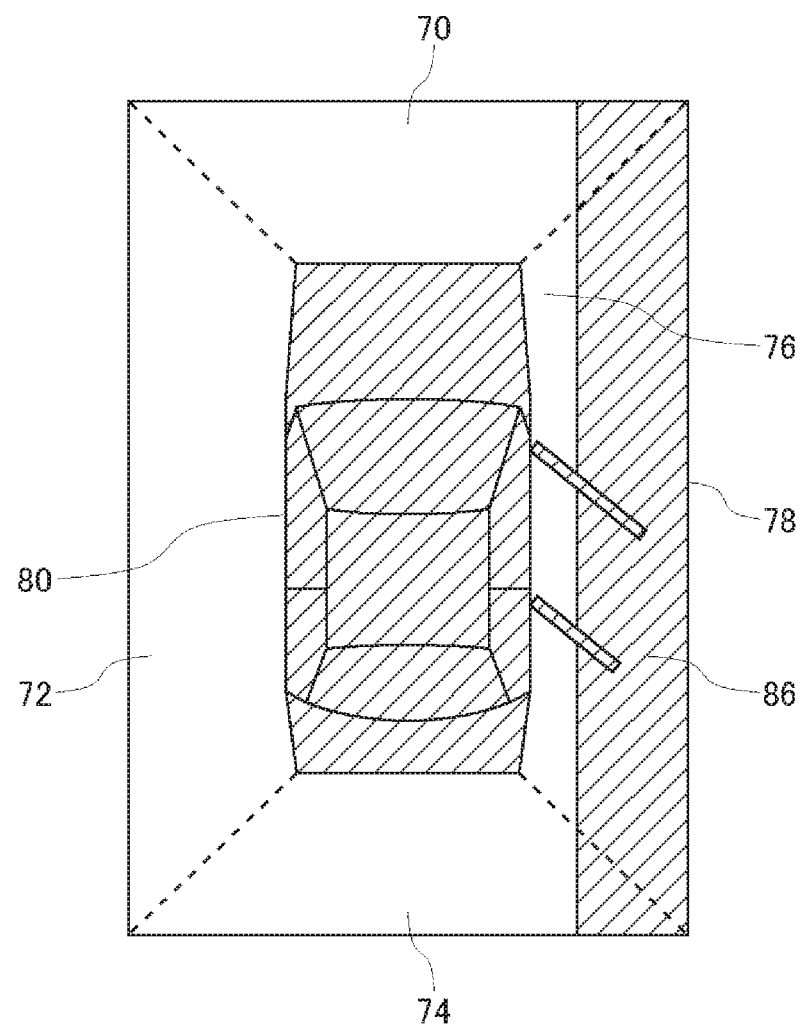
FIG. 21 shows the bird's-eye image generated by the image processor of FIG. 18.

The image processor 40 receives the bird's-eye image 78 from the generator 34 and receives the designation result and the information on the door from the road surface shape determination unit 48. When the designation result is "Open the door carefully" or "Don't open the door", i.e., when it is determined that there is a road surface shape that requires attention, the image processor 40 superimposes an image showing the road surface shape that requires attention on the bird's-eye image 78. FIG. 21 shows the bird's-eye image 78 generated by the image processor 40. This shows a case where the designation result is "Open the door carefully" and the information on the door for which designation is made indicates the door on the right side of the vehicle 100. The image processor 40 generates an "Open the door carefully" notification image 86 that should be displayed in a region overlapping the right door of the driver's vehicle icon 80 in the bird's-eye image 78. The "Open the door carefully" notification image 86 is an image to indicate "Drive carefully". The image processor 40 superimposes the "Open the door carefully" notification image 86 on the right door of the driver's vehicle icon 80 in the bird's-eye image 78. When the information on the door indicates the right and front door, the image processor 40 may superimpose the "Open the door carefully" notification image 86 only on the right and front door of the driver's vehicle icon 80.

Figure 22:
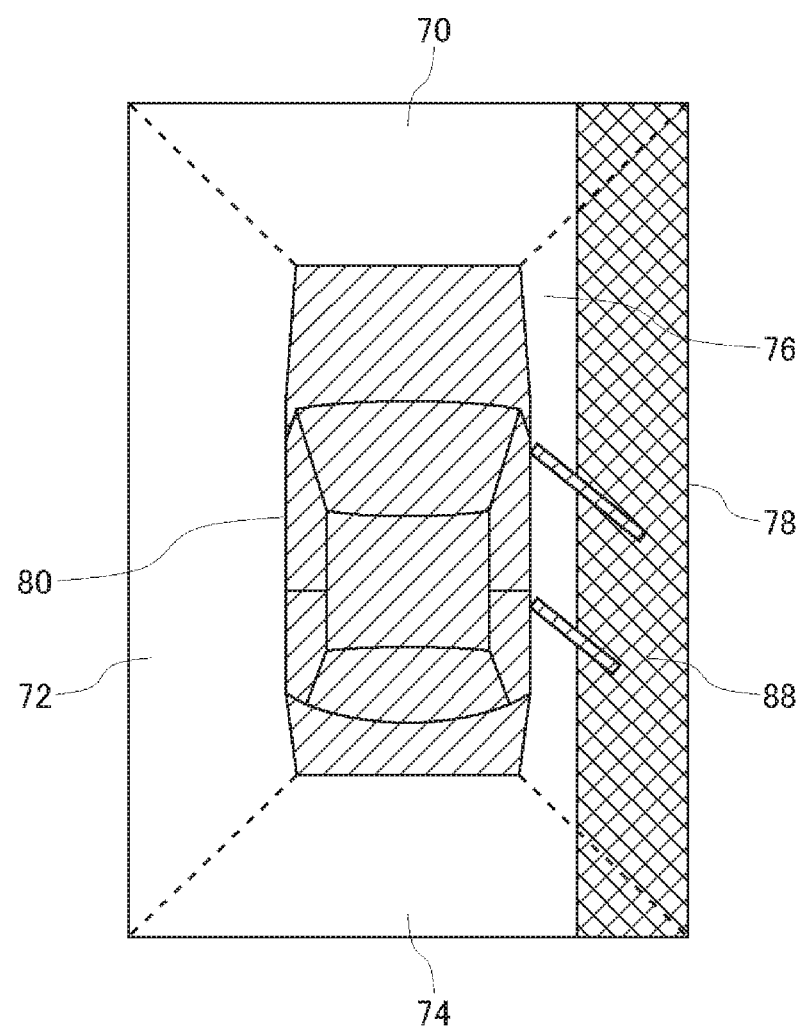
FIG. 22 shows another bird's-eye image generated by the image processor of FIG. 18.

FIG. 22 shows another bird's-eye image 78 generated by the image processor 40. This shows a case where the designation result is "Don't open the door". The image processor 40 generates a "Don't open the door" notification image 88 that should be displayed in a region overlapping the right door of the driver's vehicle icon 80 in the bird's-eye image 78. The "Don't open the door" notification image 88 is an image to indicate "Don't open the door". The image processor 40 superimposes the "Don't open the door" notification image 88 on the right door of the driver's vehicle icon 80 in the bird's-eye image 78. When the information on the door indicates the right and front door, the image processor 40 may superimpose the "Don't open the door" notification image 88 only on the right and front door of the driver's vehicle icon 80. Reference is made back to FIG. 18. The image processor 40 outputs the bird's-eye image 78 on which the "Open the door carefully" notification image 86 or the "Don't open the door" notification image 88 is superimposed or the bird's-eye image 78 on which neither the "Open the door carefully" notification image 86 nor the "Don't open the door" notification image 88 is superimposed to the display controller 42.

According to this embodiment, a determination is made as to whether a road surface shape having a step height that makes it difficult to open the door of the vehicle is found. It is therefore possible to detect a step that is difficult to be captured in the bird's-eye image. In further accordance with this embodiment, the road surface shape having a step height that makes it difficult to open the door of the vehicle is superimposed as an image so that the likelihood that the door is hit by the step is reduced. In still further accordance with this embodiment, a determination is made as to whether a step having a step height that makes it difficult to open the door adjacent to the seat in which the passenger is seated is found. Therefore, the image is displayed in association with the door that is likely to be opened. In still further accordance with this embodiment, the image is displayed in association with the door that is likely to be opened, the area of the image superimposed on the bird's-eye image is prevented from becoming too large.

Embodiment 3

In the background art, an image for alerting the driver of another vehicle nearby is displayed on the front glass of the driver's vehicle, which makes it easy for the driver to recognize an object located nearby. When the image displayed on the front glass overlaps the white line of the pedestrian crossing, it is difficult for the driver to see the image displayed on the white line because the pedestrian crossing displayed as the white line is more bright than other areas due to the reflection of light. For this, when the display region of the image and the visible, high-brightness region overlap, the display region is changed. The images captured by the imaging units provided in various locations in the vehicle are subjected to viewpoint transform to generate a bird's-eye image as viewed from above the vehicle. In displaying the bird's-eye image, it is desired to alert the driver of a location where the road surface condition is poor. This embodiment addresses this issue, and a purpose thereof is to provide a technology for knowing the road surface condition in the bird's-eye image.

Embodiment 3 relates to a vehicle display device that generates a bird's-eye image by subjecting images captured by a plurality of imaging units provided in a vehicle to viewpoint transform and displays the bird's-eye image thus generated. By using the bird's-eye image, the driver can easily know the situation near the vehicle. This makes it easy to prevent contact with a nearby obstacle from occurring when the vehicle is brought to a stop. The situation near the vehicle not only comprises the presence of a nearby obstacle but also the road surface condition. For example, the road surface condition is shown by indicating whether the road surface is dry or wet. When a puddle is found in the position where the door of the vehicle is opened, the shoes or clothes of the driver getting out of the vehicle may become wet. It is therefore desired to alert the driver etc. of the road surface condition as well.

To address this need, the vehicle display device according to this embodiment performs the following process. A plurality of ultraviolet sensors are provided in the vehicle. The transmitter of the ultraviolet sensor transmits ultrasonic waves toward the road surface and the receiver receives the reflected waves. The intensity of the reflected waves occurring when the road surface is wet is smaller than the intensity of the reflected waves occurring when the road surface is dry. The vehicle display device determines whether the road surface is dry or wet by measuring the intensity of the reflected waves and superimposes an image associated with the determination result on the bird's-eye image.

The imaging range formed around the vehicle 100 according to Embodiment 3 is as shown in the perspective view of FIG. 1. The sensors mounted on the vehicle 100 are as shown in FIG. 2. The front sensor 112 and the rear sensor 116 are not included.

Figure 23:
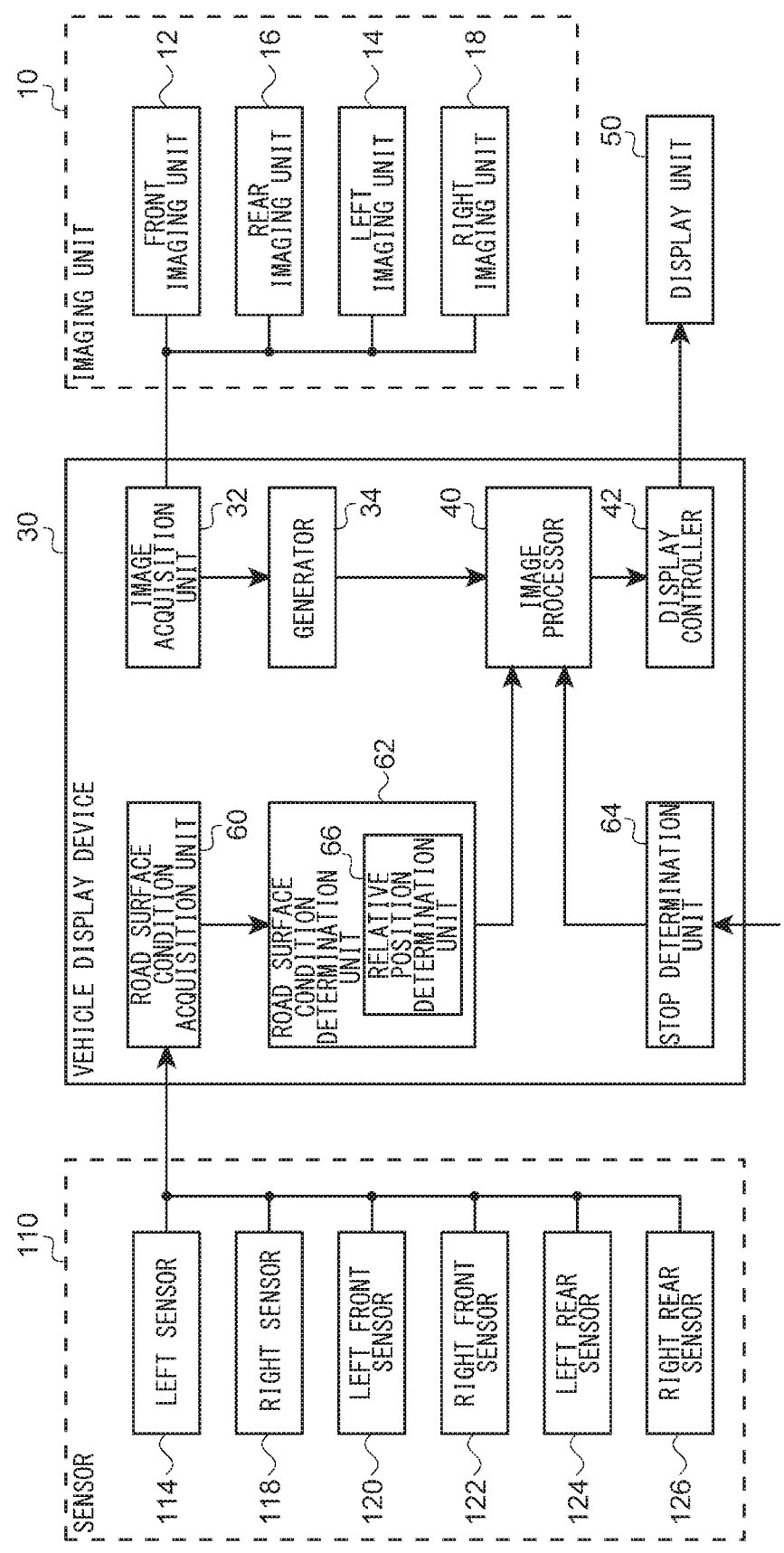
FIG. 23 shows a configuration of the vehicle display device mounted on the vehicle according to Embodiment 3.

FIG. 23 shows a configuration of the vehicle display device 30 mounted on the vehicle 100. The vehicle display device 30 is connected to the imaging unit 10, the display unit 50, and the sensor 110. The imaging unit 10 includes the front imaging unit 12, the left imaging unit 14, the rear imaging unit 16, and the right imaging unit 18. The sensor 110 includes the left sensor 114, the right sensor 118, the left front sensor 120, the right front sensor 122, the left rear sensor 124, and the right rear sensor 126. The vehicle display device 30 includes the image acquisition unit 32, the generator 34, the image processor 40, the display controller 42, a road surface condition acquisition unit 60, a road surface condition determination unit 62, and a stop determination unit 64. The road surface condition determination unit 62 includes a relative position determination unit 66.

As described above, the front imaging unit 12, the left imaging unit 14, the rear imaging unit 16, and the right imaging unit 18 capture images. The front imaging unit 12, the left imaging unit 14, the rear imaging unit 16, and the right imaging unit 18 output the images to the image acquisition unit 32. The image acquisition unit 32 receives the images from the front imaging unit 12, the left imaging unit 14, the rear imaging unit 16, and the right imaging unit 18. In other words, the image acquisition unit 32 acquires the images around the vehicle 100. The image acquisition unit 32 outputs the acquired images to the generator 34.

The generator 34 receives the images from the image acquisition unit 32. The generator 34 subjects the image to viewpoint transformation to generate a bird's-eye image as viewed from above the vehicle 100. For transformation, a publicly known technology may be used. For example, the pixels in the image may be projected onto a 3D curved surface in a virtual 3D space and a necessary region in the 3D curved surface is cut out in accordance with a virtual viewpoint above the vehicle 100. The cut-out region represents an image subjected to viewpoint transform. The bird's-eye image 78 generated by the generator 34 is as shown in FIG. 4. The generator 34 outputs the bird's-eye image 78 to the image processor 40.

The left sensor 114, the right sensor 118, the left front sensor 120, the right front sensor 122, the left rear sensor 124, and the right rear sensor 126 are collectively referred to as the sensor 110. An existent technology such as that of ultrasonic sensors may be applicable to the sensor 110. Where ultrasonic waves are used in the sensor 110, the transmitter of the sensor 110 transmits ultrasonic waves toward a predetermined range and the receiver of the sensor 110 receives the reflected waves from the predetermined range. The sensor 110 measures the intensity of the received reflected waves. A publicly known technology may be used to measure the intensity so that a description thereof is omitted.

Figure 24:
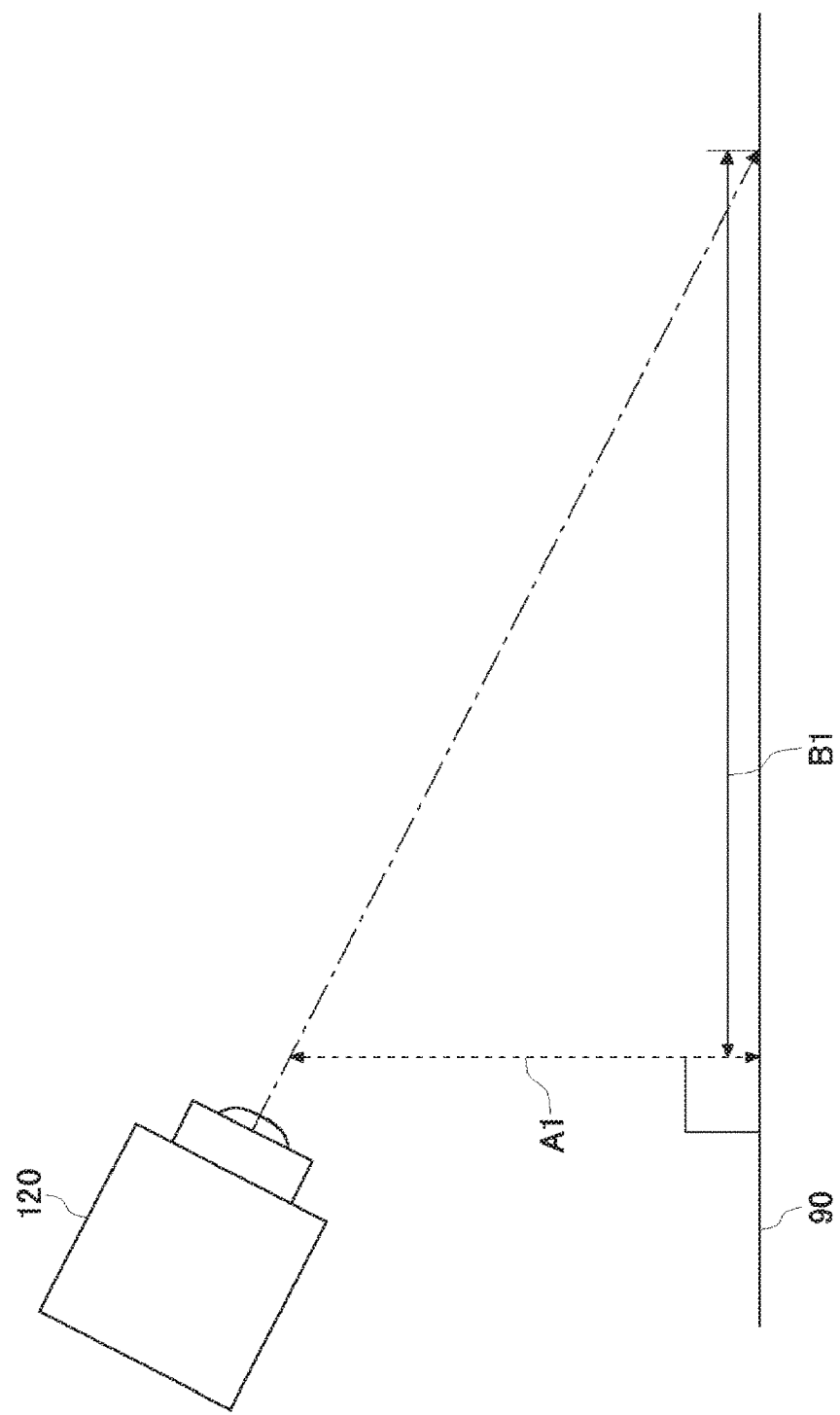
FIG. 24 shows an arrangement of the left front sensor of FIG. 23.

FIG. 24 shows an arrangement of the left front sensor 120. The left front sensor 120 is used to detect whether a puddle is found in the direction of travel. The left front sensor 120 is provided at a height "A1" from the road surface 90 and is provided to detect a distance "B1" from the vehicle 100 primarily. For example, the left front sensor 120 is provided at a position near the bonnet at the front end of the vehicle 100. "B1" is set to be 2 m. The right front sensor 122, the left rear sensor 124, and the right rear sensor 126 are similarly arranged.

Figure 25:
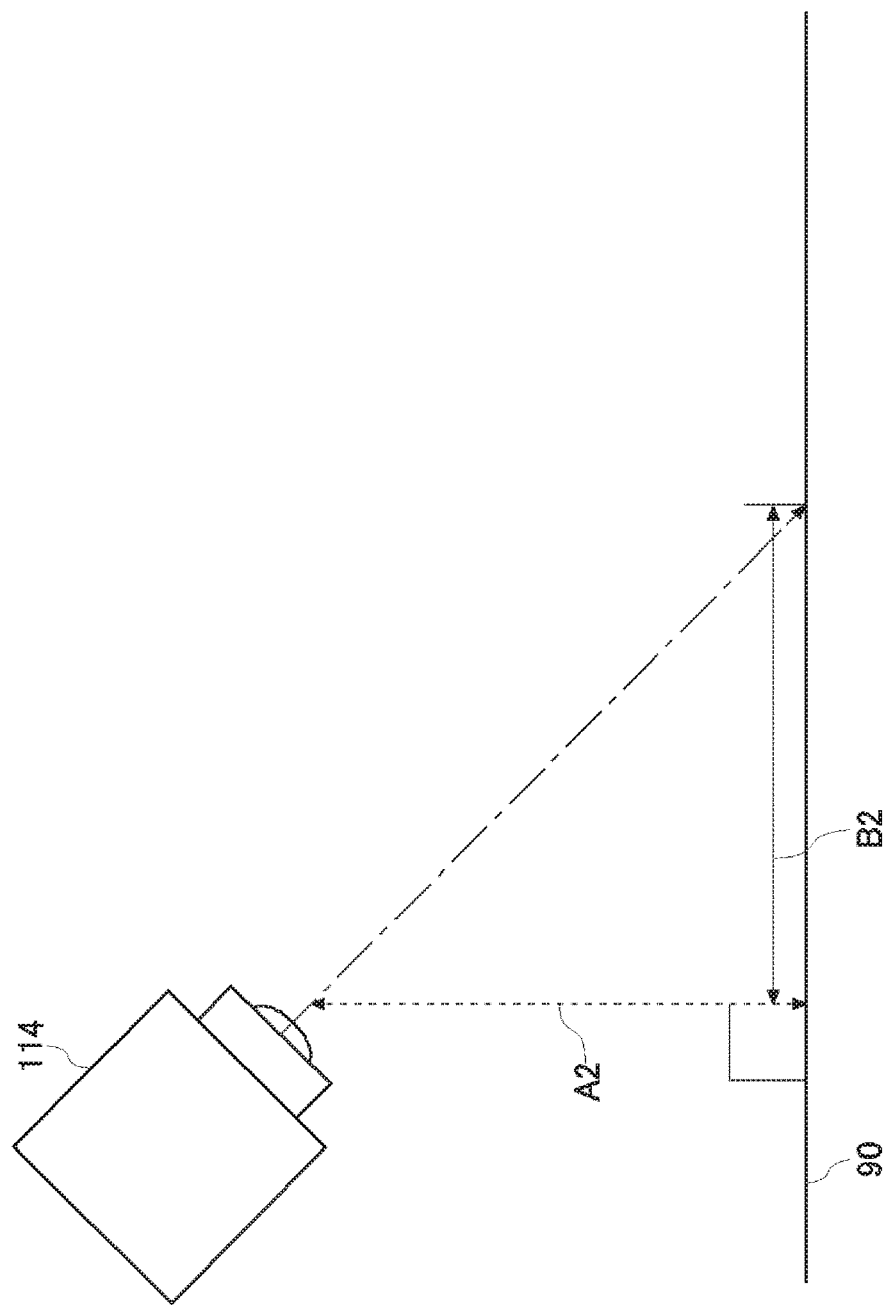
FIG. 25 shows an arrangement of the left sensor of FIG. 23.

FIG. 25 shows an arrangement of the left sensor 114. The left sensor 114 is used to detect whether a puddle, etc. is found in the position where the passenger of the vehicle 100 gets out from the left side of the vehicle 100. The left sensor 114 is provided at a height "A2" from the road surface 90 and is provided to detect a distance "B2" from the vehicle 100 primarily. For example, the left sensor 114 is provided above the door or in the door mirror. "B2" is set to be 10 cm. Reference is made back to FIG. 23. The sensor 110 outputs the measured intensity to the road surface condition acquisition unit 60.

The road surface condition acquisition unit 60 executes the function of acquiring the road surface condition by using a road surface information acquisition unit for acquiring information related to the road surface. The road surface condition acquisition unit 60 receives information on the intensity from the sensor 110. The information on the intensity represents the condition of ultrasonic reflection on the road surface 90. As mentioned above, a high intensity signifies that the road surface 90 is dry, and a low intensity signifies that the road surface 90 is wet. Therefore, the information on the intensity can be said to indicate the road surface condition around the vehicle 100. The road surface condition acquisition unit 60 outputs the information on the intensity from the sensor 110 to the road surface condition determination unit 62.

The road surface condition determination unit 62 refers to the information related to the road surface to determine whether a road surface condition that requires attention is found by using a road surface determination unit for determining whether a road surface that requires attention is found. The road surface condition determination unit 62 receives the information on the intensity from the road surface condition acquisition unit 60. The road surface condition determination unit 62 determines whether the road surface 90 is wet based on the information on the intensity. To describe it more specifically, the road surface condition determination unit 62 maintains a threshold value and compares the intensity with the threshold value. When the intensity is higher than the threshold value, the road surface condition determination unit 62 determines that the road surface 90 is dry. Meanwhile, when the intensity is equal to lower than the threshold value, the road surface condition determination unit 62 determines that the road surface 90 is wet. This is the process founded upon the fact that, where the ultrasonic sensor is used in the sensor 110, reflection from the wet road surface 90 is weaker than reflection from the dry road surface 90. The wet road surface 90 encompasses puddles and frozen roads. That the road surface 90 is wet meets the definition of a road surface condition that requires attention. It can therefore be said that the road surface condition determination unit 62 determines whether a road surface condition that requires attention is found by referring to the road surface condition, i.e., the condition of ultrasonic reflection.

When the road surface condition determination unit 62 determines that the wet road surface 90 is found, the relative position determination unit 66 determines whether the wet road surface 90 is positioned near the door of the vehicle 100 by referring to the relative positions of the wet road surface 90 and the door of the vehicle 100. The left sensor 114 and the right sensor 118 are provided near the door, and the left front sensor 120, the right front sensor 122, the left rear sensor 124, and the right rear sensor 126 are not provided near the door. Therefore, when it is determined that the wet road surface 90 is found by referring to the intensity sensed by the left sensor 114 or the right sensor 118, the relative position determination unit 66 determines that the wet road surface 90 is positioned near the door of the vehicle 100. Meanwhile, when it is determined that the wet road surface 90 is found by referring to the intensity sensed by any of the left front sensor 120 through the right rear sensor 126, the relative position determination unit 66 determines that the wet road surface 90 is not positioned near the door of the vehicle 100. The road surface condition determination unit 62 and the relative position determination unit 66 output the determination result to the image processor 40.

The stop determination unit 64 acquires information related to the traveling condition from an Electronic Control Unit (ECU) via a Controller Area Network (CAN). An example of the information related to the traveling condition is information on the traveling speed of the vehicle 100. The stop determination unit 64 refers to the information related to the traveling condition to determine that the vehicle is at a stop when it is determined that the vehicle comes to a stop or the speed of the vehicle drops below a predetermined speed. For example, the predetermined speed is set to 10 km/h. The stop determination unit 64 outputs the determination result to the image processor 40.

The image processor 40 receives the determination results from the road surface condition determination unit 62, the relative position determination unit 66, and the stop determination unit 64. When the stop determination unit 64 determines that the vehicle 100 is at a stop and when the road surface condition determination unit 62 determines that the wet road surface 90 is found, the image processor 40 superimposes an image showing the road surface condition that requires attention on the bird's-eye image 78. Particularly, when the relative position determination unit 66 determines that the wet road surface 90 is positioned near the door of the vehicle 100, the image processor 40 superimposes an image showing the road surface condition that requires attention at the position of the door of the vehicle 100 in the drive's vehicle icon 80 in the bird's-eye image 78.

Figure 26:
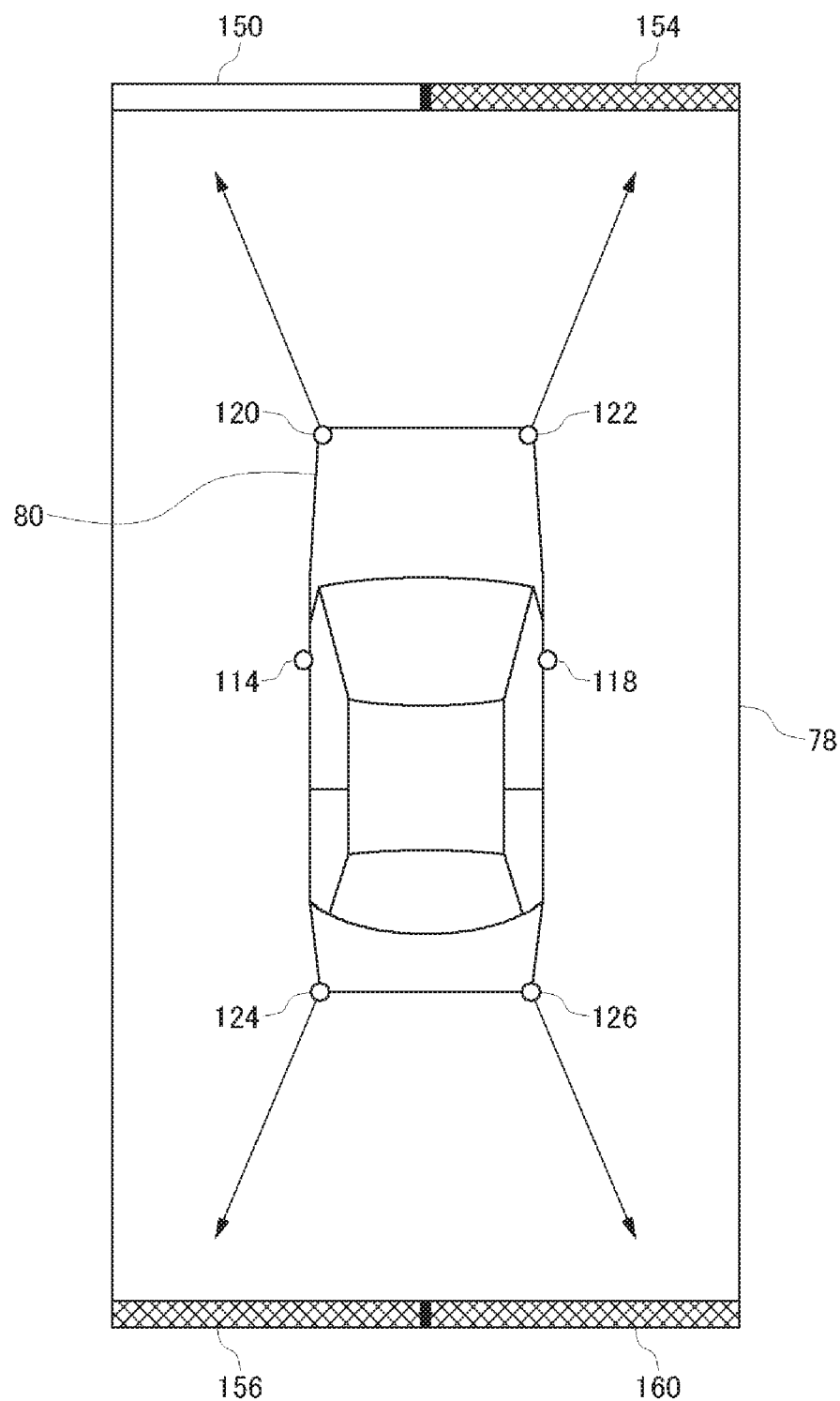
FIG. 26 show the bird's-eye image generated by the image processor of FIG. 23.

FIG. 26 show the bird's-eye image 78 generated by the image processor 40. This is the bird's-eye image 78 shown when it is determined that the wet road surface 90 is not found near the door of the vehicle 100 and when it is determined that the wet road surface 90 is found by referring to the intensity sensed by the left front sensor 120. The bird's-eye image 78 shows the left front notification image 150, the right front notification image 154, the left rear notification image 156, and the right rear notification image 160. The left front notification image 150 and the right front notification image 154 are arranged in front of the drive's vehicle icon 80. The left rear notification image 156 and the right rear notification image 160 are arranged behind the driver's vehicle icon 80.

The left front notification image 150 is an image to show "there is a wet road surface 90" or "there is a dry road surface 90" in accordance with the intensity sensed by the left front sensor 120. When "there is a wet road surface 90", the left front notification image 150 is shown in "plain white". When "there is a dry road surface 90", the left front notification image 150 is shown in "a shaded pattern". By way of one example, the figure shows the former case. The left front notification image 150 shown in "plain white" represents the image showing the road surface condition that requires attention mentioned above.

Similarly, the right front notification image 154, the left rear notification image 156, and the right rear notification image 160 show the results of detection by the right front sensor 122, the left rear sensor 124, and the right rear sensor 126, respectively. By way of one example, these images are shown in "a shaded pattern" and so represent the case where "there is a dry road surface 90". When the vehicle 100 is traveling forward, the left rear notification image 156 and the right rear notification image 160 need not to be displayed so that the left rear notification image 156 and the right rear notification image 160 may be displayed in "a shaded pattern" regardless of the road surface condition. Meanwhile, when the vehicle 100 is traveling backward, the left front notification image 150 and the right front notification image 154 need not to be displayed so that the left front notification image 150 and the right front notification image 154 may be displayed in "a shaded pattern" regardless of the road surface condition.

Figure 27:
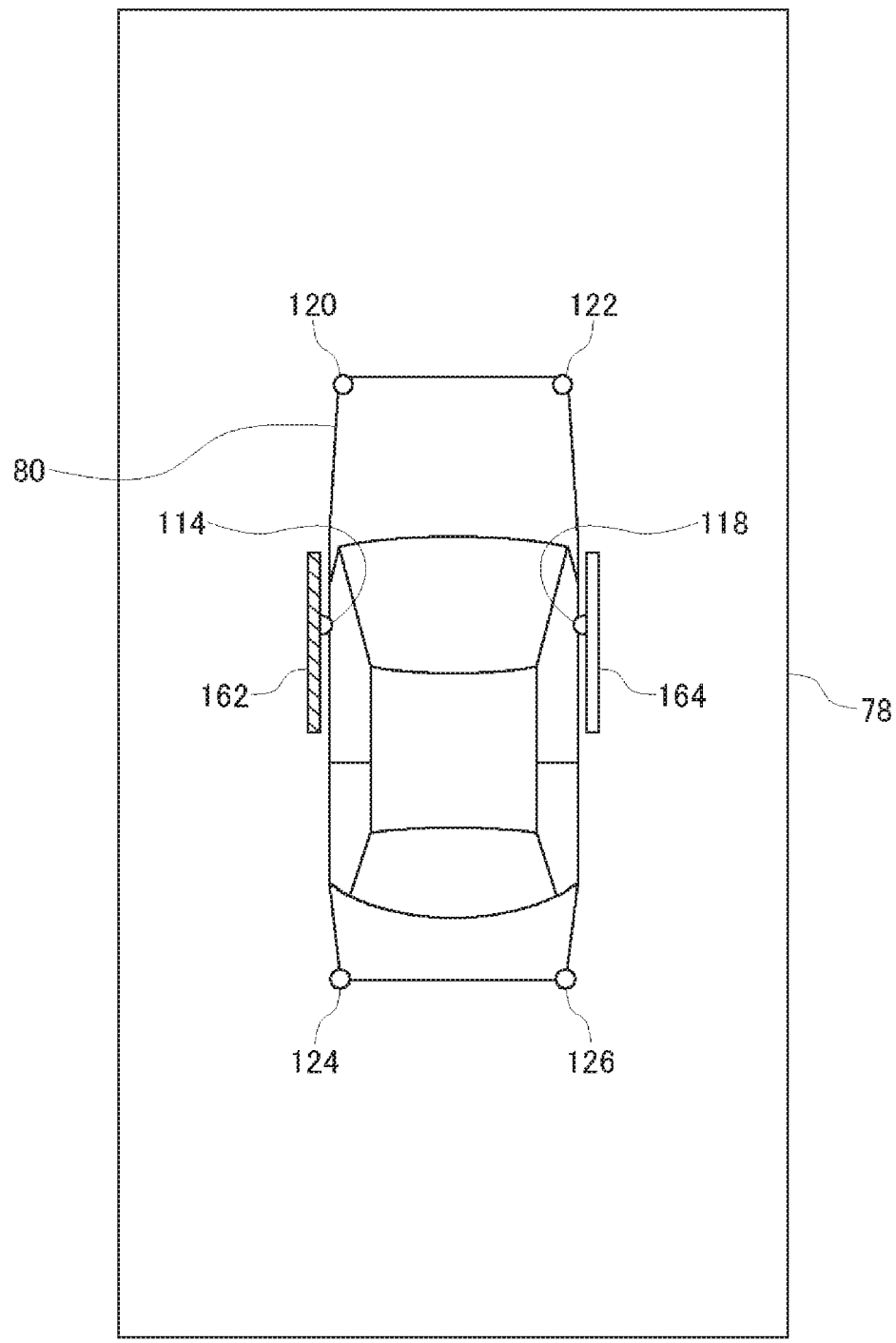
FIG. 27 shows another bird's-eye image generated by the image processor of FIG. 23.

FIG. 27 shows another bird's-eye image 78 generated by the image processor 40. This is the bird's-eye image 78 shown when it is determined that the wet road surface 90 is positioned near the door of the vehicle 100. The bird's-eye image 78 shows the left notification image 162 and the right notification image 164 instead of the left front notification image 150, etc. of FIG. 26. The left notification image 162 is provided to the left of the drive's vehicle icon 80, and the right notification image 164 is provided to the right of the driver's vehicle icon 80. The right notification image 164 is an image to show "there is a wet road surface 90" or "there is a dry road surface 90" in accordance with the intensity sensed by the right sensor 118. When "there is a wet road surface 90", the right notification image 164 is shown in "plain white". When "there is a dry road surface 90", the right notification image 164 is shown in "a shaded pattern".

By way of one example, the figure shows the former case. The right notification image 164 shown in "plain white" represents the image showing the road surface condition that requires attention mentioned above. Similarly, the left notification image 162 shows the result of detection by the left sensor 114. By way of one example, the left notification image 162 is shown in "a shaded pattern" and so represent the case where "there is a dry road surface 90". The left notification image 162 and the right notification image 164 need to be displayed when the passenger gets out of the vehicle. Therefore, the left notification image 162 and the right notification image 164 may be started to be displayed when the vehicle 100 slows down to a crawling speed.

Figure 28:
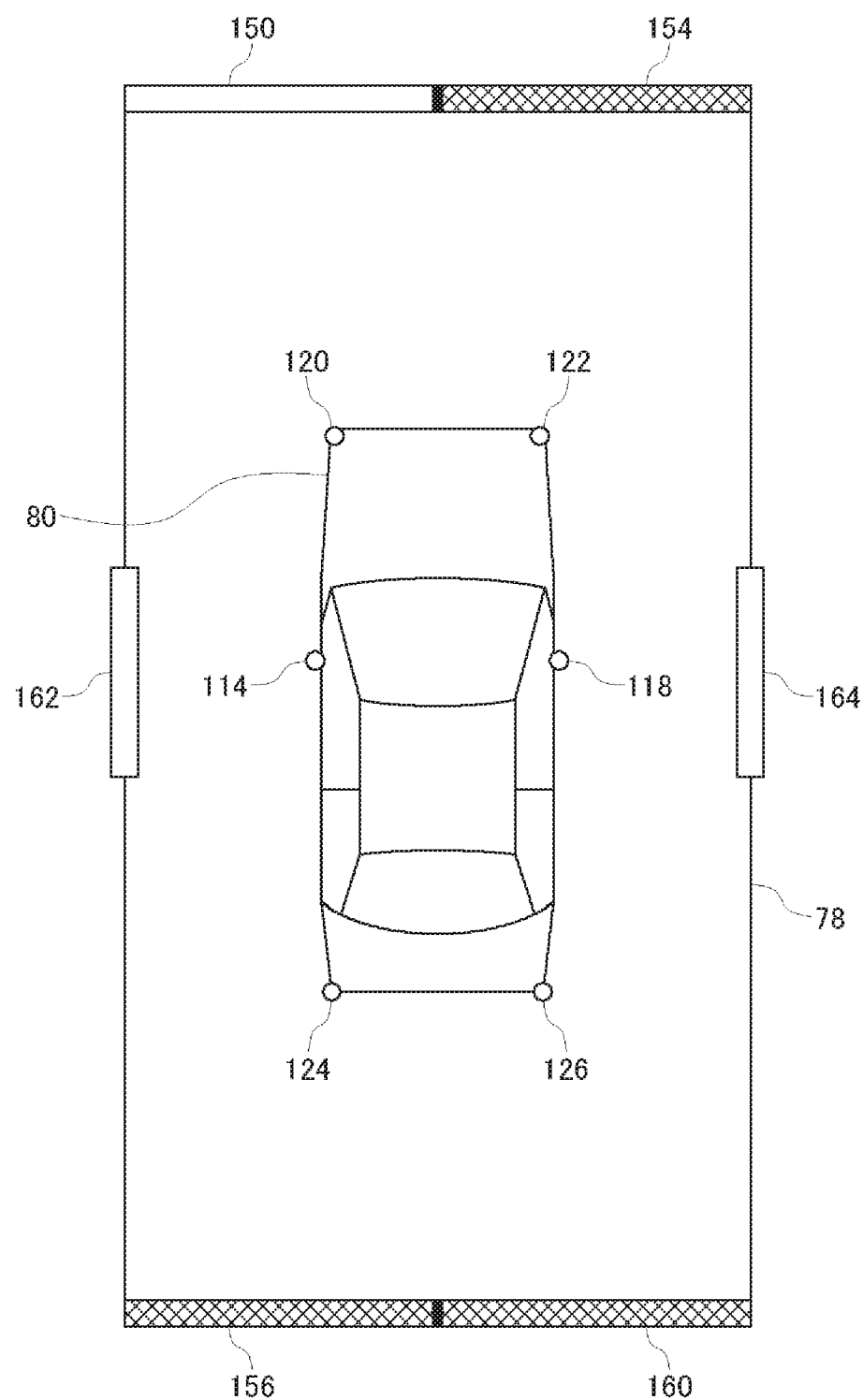
FIG. 28 shows still another bird's-eye image generated by the image processor of FIG. 23.

FIG. 28 shows still another bird's-eye image 78 generated by the image processor 40. In this case, the left front notification image 150 through the right rear notification image 160, the left notification image 162, and the right notification image 164 are shown. When the speed of the vehicle 100 increases from the crawling speed, the tilt angles of the left sensor 114 and the right sensor 118 are changed to become identical with the tilt angle of the left front sensor 120, etc.

Figure 29:
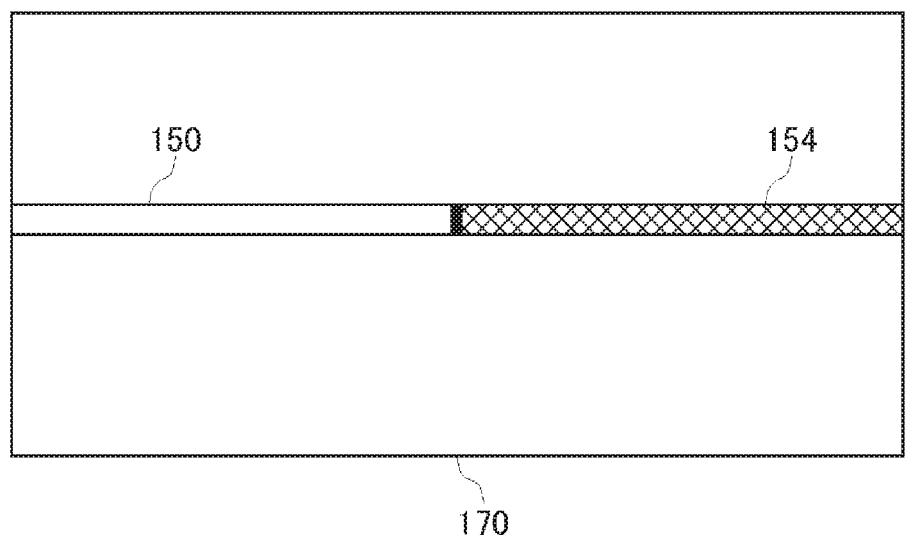
FIG. 29 shows an image generated by the image processor of FIG. 23.

The image processor 40 has been described so far as superimposing an image indicating a road surface condition that requires attention on the bird's-eye image 78. Alternatively, an image showing the road surface condition that requires attention may be superimposed on an image captured by the imaging unit 10. FIG. 29 shows an image generated by the image processor 40. In FIG. 29, the left front notification image 150 and the right front notification image 154 are arranged in the front image 170 captured by the front imaging unit 12. The left front notification image 150 and the right front notification image 154 are as described above. Reference is made back to FIG. 23.

The display controller 42 receives the bird's-eye image 78 from the image processor 40. The display controller 42 causes the display unit 50 to display the bird's-eye image 78 by performing a process of displaying the bird's-eye image 78. The display unit 50 may be a display panel. The display unit 50 displays the bird's-eye image 78 as shown in one of FIGS. 26 through 29.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only, software only, or by a combination of hardware and software.

Figure 30:
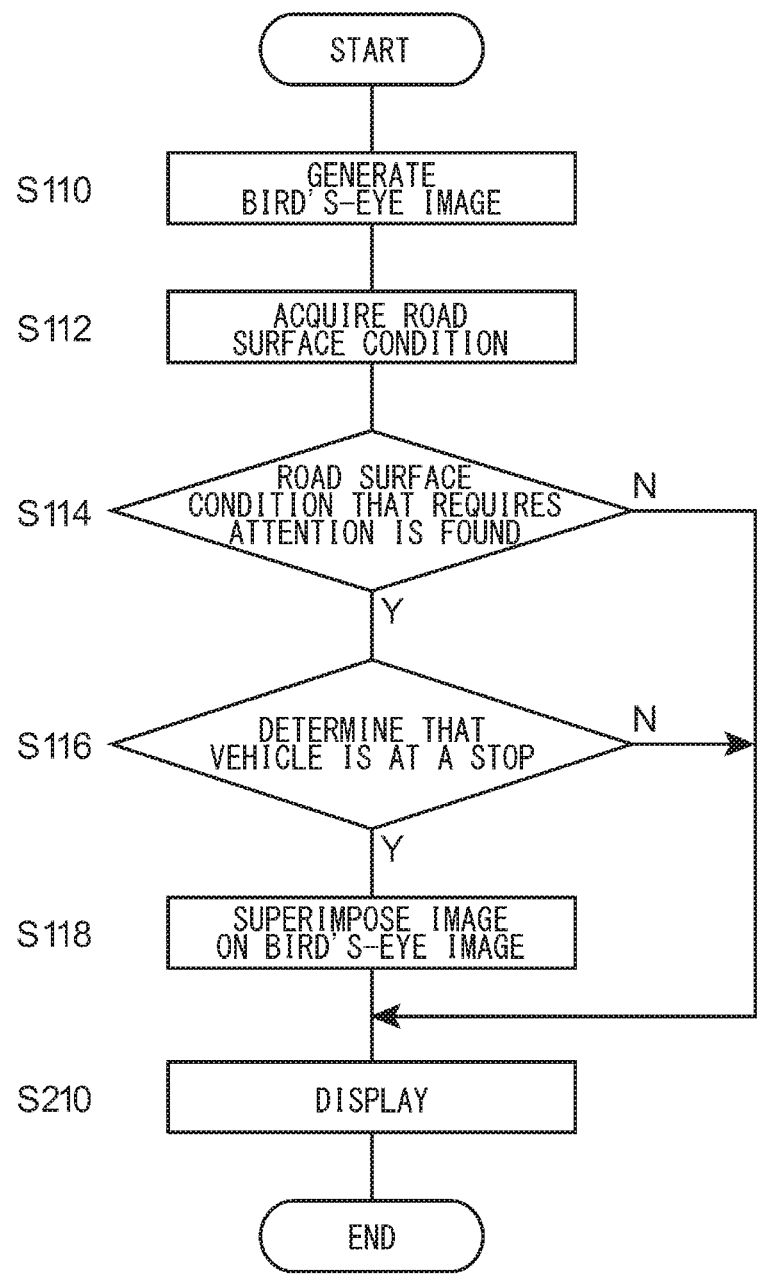
FIG. 30 is a flowchart showing the steps for display performed by the vehicle display device of FIG. 23.

A description will now be given of the operation of the vehicle display device 30 with the above features. FIG. 30 is a flowchart showing the steps for display performed by the vehicle display device 30. The generator 34 generates the bird's-eye image 78 (S110). The road surface condition acquisition unit 60 acquires the road surface condition (S112). When a road surface condition that requires attention is found (Y in S114) and when the stop determination unit 64 determines that the vehicle is at a stop (Y in S116), the image processor 40 superimposes the image on the bird's-eye image 78 (S118). When a road surface condition that requires attention is not found (N in S114), or when the stop determination unit 64 does not determine that the vehicle is at a stop (N in S116), step 118 is skipped. The display unit 50 displays the bird's-eye image 78 (S120).

According to this embodiment, when it is determined that a road surface condition that requires attention is found, the image showing the road surface condition that requires attention is superimposed so that an alert of the road surface condition that requires attention is output. Since an alert of the road surface condition that requires attention is output, it is possible to know whether the road surface is wet in the bird's-eye image. Further, when it is determined that the vehicle is at a stop and that a road surface condition that requires attention is found, the image showing the road surface condition that requires attention is superimposed on the bird's-eye image. It is therefore possible to allow the driver, etc. getting out of the vehicle to know the road surface condition in the bird's-eye image.

Further, when it is determined that the road surface condition that requires attention is positioned near the door, the image is superimposed at the position of the door in the driver's vehicle icon in the bird's-eye image. It is therefore possible to allow the driver, etc. getting out of the vehicle to know the road surface condition in the bird's-eye image. Since a determination is made as to whether the road surface is wet is made by referring to the condition of ultrasonic reflection on the road surface, the road surface condition is determined. Since the intensity of the reflected waves is compared to that of the transmitted ultrasonic waves, a determination can be made as to whether the road surface is wet.

Embodiment 4

A description will now be given of Embodiment 4. Like Embodiment 3, Embodiment 4 relates to vehicle display device that displays a bird's-eye image showing a road surface condition. The description of Embodiment 4 is particularly directed to a case where a road surface condition that requires attention when the door of the vehicle is opened. The vehicle 100 according to Embodiment 4 is of the same type as that of FIGS. 1 and 2. The description here concerns a difference.

Figure 31:
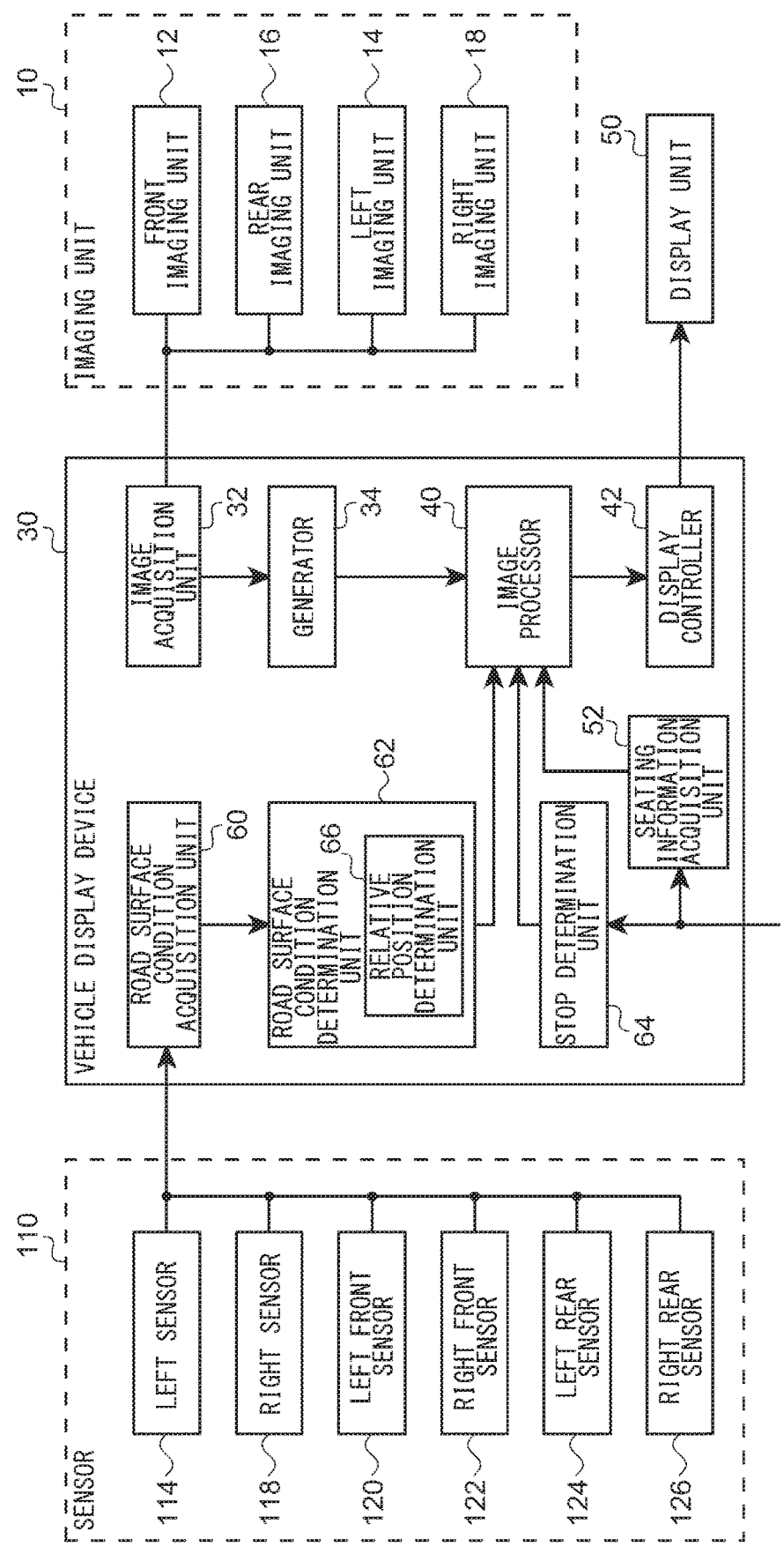
FIG. 31 shows a configuration of the vehicle display device according to Embodiment 4.

FIG. 31 shows a configuration of the vehicle display device 30 according to Embodiment 4. In the vehicle display device 30, a seating information acquisition unit 52 is added to the vehicle display device 30 of FIG. 23. The seating information acquisition unit 52 is connected to a seating sensor (not shown) provided in each of the plurality of seats in the vehicle 100 and receives results of detection from the seating sensors. A publicly known technology may be used in the seating sensors. The results of detection from the seating sensors indicate whether a passenger is seated at the seat and can be said to be seated/non-seated information. The seating information acquisition unit 52 identifies the seat in which the passenger is seated by referring to the seated/non-seated information. The seating information acquisition unit 52 outputs information related to the seat in which the passenger is seated to the image processor 40.

The image processor 40 receives the information related to the seat in which the passenger is seated from the seating information acquisition unit 52. The image processor 40 refers to the information and identifies the door of the vehicle 100 doors corresponding to the seat in which the passenger is seated. The image processor 40 superimposing an image showing the road surface condition that requires attention on the position of the identified door. When the identified door is the right door of the vehicle 100, for example, the image processor 40 only displays the right notification image 164 and does not display the left notification image 162. In the case where the right notification image 164 is shown in "plain white", it can be said that an image showing the road surface condition that requires attention is superimposed. When the identified door is the left door of the vehicle 100, a similar process is performed.

Since an image is superimposed at the position of the door corresponding to the seat in which the passenger is seated according to this embodiment, the image is displayed for the door likely to be used to get out of the vehicle. Since the image is displayed for the door likely to be used to get out of the vehicle, an alert can be output.

Given above is an explanation based on exemplary embodiments. The embodiment is intended to be illustrative only and it will be understood by those skilled in the art that various modifications to constituting elements and processes could be developed and that such modifications are also within the scope of the present invention.

Arbitrary combinations of Embodiment 1 through Embodiment 4 will also be useful. According to this variation, arbitrary combined advantages of Embodiment 1 through Embodiment 4 can be obtained.

In Embodiments 3 and 4, the road surface condition acquisition unit 60 uses the sensor 110 to acquire the condition of ultrasonic reflection on the road surface 90 to identify the road surface condition. Alternatively, however, the road surface condition acquisition unit 60 may use the bird's-eye image 78 generated by the generator 34 to acquire shade changes in the bird's-eye image 78 to identify the road surface condition. In this process, the road surface condition determination unit 62 determines whether the road surface 90 is wet by referring to the shade changes acquired by the road surface condition acquisition unit 60. For example, the road surface condition determination unit 62 derives the shade change for each pair of adjacent pixels. If the shade change is larger than a threshold value, the road surface condition determination unit 62 determines that the relevant portion is the boundary of a puddle, or the like. According to this variation, the shape of a puddle or the like is identified.

The road surface condition acquisition unit 60 may use the sensor 110 to acquire the condition of ultrasonic reflection on the road surface 90 to identify the road surface condition and may also use the bird's-eye image 78 generated by the generator 34 to acquire the shade changes in the bird's-eye image 78 to identify the road surface condition. In this case, the road surface condition determination unit 62 detects the wet portion of the road surface 90 by referring to the condition of ultrasonic reflection and then detects the boundary of a puddle or the like by referring to the shade changes around the detected portion. According to this variation, the shape of a puddle, or the like is efficiently identified.

In Embodiments 3 and 4, the display controller 42 causes the display unit 50 to display the bird's-eye image 78 on which the image showing the road surface condition that requires attention is superimposed. Alternatively, however, a light emitting diode (LED) may be provided near the door knob and the display controller 42 may control the LED to display a color similar to the color on the screen. When the road surface condition that requires attention is detected, the door may be prevented from being unlocked or forced to be locked. The person attempting to get out of the vehicle may be alerted that there is a bad road condition near the door. According to this variation, the road surface condition that requires attention can be made known.

What is claimed is:

1. A vehicle display device comprising:
an image acquisition unit that acquires an image around a vehicle;
a generator that subjects the image acquired by the image acquisition unit to viewpoint transform to generate a bird's-eye image as viewed from above the vehicle;
a road surface information acquisition unit that acquires information on a road surface shape or a road surface condition around the vehicle;
a road surface determination unit that determines whether a road surface shape or a road surface condition that requires attention is found by referring to the information on the road surface shape or the road surface condition acquired by the road surface information acquisition unit;
an image processor that, when the road surface determination unit determines that a road surface shape or a road surface condition that requires attention is found, superimposes an image showing the road surface shape or the road surface condition that requires attention on the bird's-eye image; and
a display controller that causes a display unit to display the bird's-eye image on which the image is superimposed by the image processor, wherein
the road surface determination unit determines whether a road surface shape that requires attention is found by determining whether a road surface shape having a step height that makes it difficult for the vehicle to travel and descending in a direction away from the vehicle is found.

2. A vehicle display device comprising:
an image acquisition unit that acquires an image around a vehicle;
a generator that subjects the image acquired by the image acquisition unit to viewpoint transform to generate a bird's-eye image as viewed from above the vehicle;

a road surface information acquisition unit that acquires information on a road surface shape or a road surface condition around the vehicle;
a road surface determination unit that determines whether a road surface shape or a road surface condition that requires attention is found by referring to the information on the road surface shape or the road surface condition acquired by the road surface information acquisition unit;
an image processor that, when the road surface determination unit determines that a road surface shape or a road surface condition that requires attention is found, superimposes an image showing the road surface shape or the road surface condition that requires attention on the bird's-eye image; and
a display controller that causes a display unit to display the bird's-eye image on which the image is superimposed by the image processor;
a stop determination unit that determines that the vehicle is at a stop when the vehicle comes to a stop or when the speed of the vehicle drops below a predetermined speed; and
a relative position determination unit that determines, when the road surface determination unit determines that a road surface condition that requires attention is found, determines whether the road surface condition that requires attention is positioned near a door of the vehicle by referring to relative positions of the road surface condition that requires attention and the door of the vehicle, wherein
the generator adds a driver's vehicle icon indicating a position of the vehicle to the bird's-eye image, and
the image processor superimposes an image showing a road surface condition that requires attention on a position of the door of the vehicle in the driver's vehicle icon in the bird's-eye image when the stop determination unit determines that the vehicle is at a stop, when the road surface determination unit determines that a road surface condition that requires attention is found, and when the relative position determination unit determines that the road surface condition that requires attention is positioned near the door of the vehicle.

3. A vehicle display device comprising:
an image acquisition unit that acquires an image around a vehicle;
a generator that subjects the image acquired by the image acquisition unit to viewpoint transform to generate a bird's-eye image as viewed from above the vehicle;
a road surface information acquisition unit that acquires information on a road surface shape or a road surface condition around the vehicle;
a road surface determination unit that determines whether a road surface shape or a road surface condition that requires attention is found by referring to the information on the road surface shape or the road surface condition acquired by the road surface information acquisition unit;
an image processor that, when the road surface determination unit determines that a road surface shape or a road surface condition that requires attention is found, superimposes an image showing the road surface shape or the road surface condition that requires attention on the bird's-eye image;
a display controller that causes a display unit to display the bird's-eye image on which the image is superimposed by the image processor; and
a seating information acquisition unit that acquires seated/non-seated information on a plurality of seats in the vehicle, wherein
the road surface determination unit determines whether a road surface shape that requires attention is found by determining whether a road surface shape that requires attention is found at a position of a door of the vehicle associated with the seat that is acquired by the seating information acquisition unit as being occupied.

4. The vehicle display device according to claim 3, wherein
the road surface determination unit determines whether a road surface shape that requires attention is found by determining whether a road surface shape having a step height that makes it difficult to open a door of the vehicle associated with the seat that is acquired by the seating information acquisition unit as being occupied is found.

5. The vehicle display device according to claim 3, further comprising:
a stop determination unit that determines that the vehicle is at a stop when the vehicle comes to a stop or when the speed of the vehicle drops below a predetermined speed, wherein
the image processor superimposes an image showing a road surface condition that requires attention on the bird's eye image at a position of the door of the vehicle associated with the seat that is occupied, when the stop determination unit determines that the vehicle is at a stop and when the road surface determination unit determines that a road surface condition that requires attention is found.

6. The vehicle display device according to claim 5, wherein the road surface information acquisition unit acquires a condition of ultrasonic reflection on a road surface to identify the road surface condition, and
the road surface determination unit determines whether the road surface is wet by referring to the condition of ultrasonic reflection on the road surface acquired by the road surface information acquisition unit.

7. The vehicle display device according to claim 5, wherein
the road surface information acquisition unit acquires shade change in the bird's-eye image to identify the road surface condition, and
the road surface determination unit determines whether the road surface is wet by referring to the shade change acquired by the road surface information acquisition unit.

* * * * *